United States Patent
Bassin et al.

(10) Patent No.: US 7,917,897 B2
(45) Date of Patent: *Mar. 29, 2011

(54) DEFECT RESOLUTION METHODOLOGY AND TARGET ASSESSMENT PROCESS WITH A SOFTWARE SYSTEM

(75) Inventors: Kathryn Allyn Bassin, Harpursville, NY (US); Brian Richard Lepel, Rochester, MN (US); Warren James Leslie, Pickering (CA); Susan Eileen Skrabanek, Talking Rock, GA (US); Crystal Faye Springer, Marietta, GA (US); Nathan Gary Steffenhagen, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

This patent is subject to a terminal disclaimer.

(21) Appl. No.: 11/675,920

(22) Filed: Feb. 16, 2007

(65) Prior Publication Data

US 2008/0201611 A1    Aug. 21, 2008

(51) Int. Cl.
G06F 9/44 (2006.01)
G06F 9/45 (2006.01)
(52) U.S. Cl. .................. 717/131; 717/126; 717/130
(58) Field of Classification Search .......... 717/124–132, 717/141–143
See application file for complete search history.

(56) References Cited

U.S. PATENT DOCUMENTS

| | | | | |
|---|---|---|---|---|
| 5,475,843 A | * | 12/1995 | Halviatti et al. | 717/124 |
| 5,758,061 A | * | 5/1998 | Plum | 714/35 |
| 5,838,979 A | * | 11/1998 | Hart et al. | 717/146 |
| 6,029,002 A | * | 2/2000 | Afifi et al. | 717/131 |
| 6,031,990 A | * | 2/2000 | Sivakumar et al. | 717/124 |
| 6,071,317 A | * | 6/2000 | Nagel | 717/128 |
| 6,118,447 A | * | 9/2000 | Harel | 717/131 |
| 6,219,829 B1 | * | 4/2001 | Sivakumar et al. | 717/131 |
| 6,895,578 B1 | * | 5/2005 | Kolawa et al. | 717/130 |
| 6,901,535 B2 | | 5/2005 | Yamauchi et al. | |
| 7,028,290 B2 | * | 4/2006 | Srivastava et al. | 717/124 |
| 7,051,320 B2 | * | 5/2006 | Claiborne | 717/127 |
| 7,093,235 B2 | * | 8/2006 | Andrews et al. | 717/124 |
| 7,120,902 B2 | * | 10/2006 | Flanagan et al. | 717/130 |
| 7,150,006 B2 | * | 12/2006 | Bliss et al. | 717/124 |
| 7,216,339 B2 | * | 5/2007 | Simkins | 717/126 |
| 7,305,325 B2 | | 12/2007 | Kostyk et al. | |
| 7,401,321 B2 | * | 7/2008 | Sit et al. | 717/125 |
| 7,516,438 B1 | | 4/2009 | Leonard et al. | |

(Continued)

OTHER PUBLICATIONS

Mohagheghi et al, "An empirical study of software reuse vs defect density and stability", IEEE ICSE, pp. 1-11, 2004.*

(Continued)

*Primary Examiner* — Anil Khatri
(74) *Attorney, Agent, or Firm* — Patterson & Sheridan, LLP

(57) ABSTRACT

Embodiments of the invention are generally related to computer systems, and more specifically to the analysis of defects in computer software products. Defects uncovered during software testing may be stored in a data structure as data defects, code defects, or environment defects, along with further data describing a particular nature of the defects. The defects may be analyzed to determine a particular problem area causing the defects. If a particular class of defects is determined to be the dominant class of defects encountered during testing, an analysis path of that class of defects may be followed to determine a cause for the defects in the respective class. Therefore, corrective measures tailored to resolving the defects associated with the determined cause may be taken.

19 Claims, 15 Drawing Sheets

U.S. PATENT DOCUMENTS

| | | | | |
|---|---|---|---|---|
| 7,539,978 | B1* | 5/2009 | Haddox et al. | 717/130 |
| 7,614,043 | B2* | 11/2009 | Ognev et al. | 717/126 |
| 7,634,766 | B2* | 12/2009 | Ali et al. | 717/141 |
| 7,640,537 | B2* | 12/2009 | Simkins | 717/126 |
| 7,685,471 | B2* | 3/2010 | Rajan et al. | 714/38 |
| 2006/0251073 | A1 | 11/2006 | Lepel et al. | |
| 2006/0265188 | A1 | 11/2006 | French et al. | |

OTHER PUBLICATIONS

Hallem et al, "Uprooting software defects at the source", ACM Queue, pp. 65-71, vol. 1, issue 8, 2003.*

Fenton et al, "Project data incorporating qualitative factors for improved software defect predection", IEEE Promise, pp. 1-10, 2007.*

Ayewah et al, "Evaluatiing static analysis defect warnings on productions software", ACM Paste, pp. 1-7, 2007.*

Henderson, "Managing software defects: Defect analysis and traceability", ACM SIGSOFT, vol. 33, No. 4, pp. 1-3, 2008.*

Gokhale et al, "Software defect repair times: A multiplicative model", ACM Promise, pp. 93-100, 2008.*

Bridge, Norm et al, "Orthogonal Defect Classification Using Defect Data to Improve Software Development", Software Quality, vol. 3, 1998.

IBM Patent Application, U.S. Appl. No. 11/340,740; entitled "Methods and Apparatus for Considering a Project Environment During Defect Analysis," filed by Kathryn A. Bassin et al. on Jan. 26, 2006.

* cited by examiner

| TABLE 2: ARTIFACT TYPE TO QUALIFIER CLASSIFICATION MAPPING: | |
|---|---|
| WHEN ARTIFACT TYPE= | THEN ARTIFACT TYPE QUALIFIER OPTIONS ARE: |
| MASTER DATA CONFIGURATION | • INCORRECT<br>• MISSING<br>• CONFUSING / MISLEADING INFORMATION (PROVIDED BY CUSTOMER)<br>• CONFUSING / MISLEADING INFORMATION (PROVIDED BY COMPONENT / SYSTEM) |
| VALIDITY | • INCORRECT (FROM COMPONENT)<br>• INCORRECT (FROM CUSTOMER)<br>• INCORRECT (CREATED BY TEST)<br>• CONFUSING / MISLEADING INFORMATION (CUSTOMER)<br>• CONFUSING / MISLEADING INFORMATION (COMPONENT / SYSTEM)<br>• WITHDRAWN / NOT NOTIFIED (BY CUSTOMER)<br>• WITHDRAWN / NOT NOTIFIED (BY COMPONENT / SYSTEM)<br>• WITHDRAWN / OVERLOOKED<br>• EXPIRED / NOT NOTIFIED (BY CUSTOMER)<br>• EXPIRED / NOT NOTIFIED (BY COMPONENT / SYSTEM)<br>• EXPIRED / OVERLOOKED |
| FORMAT | • INCORRECT (CREATED BY TEST)<br>• INCORRECT (FROM COMPONENT)<br>• INCORRECT (FROM CUSTOMER)<br>• CONFUSING / MISLEADING INFORMATION (CUSTOMER)<br>• CONFUSING / MISLEADING INFORMATION (COMPONENT / SYSTEM) |
| MIGRATION | • INCORRECT (MAPPING)<br>• MISSING (MAPPING) |
| CORRUPTION | • CORRUPTION SOURCE KNOWN / LOGIC CORRECTED (CUSTOMER)<br>• CORRUPTION SOURCE KNOWN / LOGIC CORRECTED (COMPONENT / SYSTEM)<br>• CORRUPTION SOURCE KNOWN / LOGIC CORRECTED (CREATED BY TEST)<br>• CORRUPTION SOURCE UNKNOWN (CUSTOMER)<br>• CORRUPTION SOURCE UNKNOWN (COMPONENT / SYSTEM)<br>• CORRUPTION SOURCE UNKNOWN (CREATED BY TEST) |

*Fig. 3A*

| TABLE 3: CALCULATED FIELD LOGIC FOR FOCUS AREA FIELD ||
|---|---|
| FOCUS AREA: | COMPRISED OF FAILURES WITH THE FOLLOWING QUALIFIERS: |
| SKILL / TRAINING / PROCESS | • INCORRECT (CREATED BY TEST)<br>• MISSING<br>• EXPIRED / OVERLOOKED<br>• WITHDRAWN / OVERLOOKED |
| COMMUNICATION | • EXPIRED / NOT NOTIFIED (BY CUSTOMER)<br>• EXPIRED / NOT NOTIFIED (BY COMPONENTS / SYSTEM)<br>• WITHDRAWN / NOT NOTIFIED (BY CUSTOMER)<br>• WITHDRAWN / NOT NOTIFIED (BY COMPONENT / SYSTEM)) |
| COMPONENT / SYSTEM | • CORRUPTION SOURCE KNOWN / LOGIC CORRECTED (COMPONENT / SYSTEM)<br>• CORRUPTION SOURCE UNKNOWN (COMPONENTS / SYSTEM)<br>• CONFUSING / MISLEADING INFORMATION (COMPONENT / SYSTEM) |
| CUSTOMER | • CORRUPTION SOURCE KNOWN / LOGIC CORRECTED (CUSTOMER)<br>• CORRUPTION SOURCE UNKNOWN (CUSTOMER)<br>• CONFUSING / MISLEADING INFORMATION (CUSTOMER) |

| FIELD | CLASSIFICATION |
|---|---|
| 410 — TARGET | ENVIRONMENT |
| 420 — ARTIFACT TYPE | CONFIGURATION / DEFINITION<br>CONNECTIVITY<br>SYSTEM / COMPONENT COMPLETENESS<br>SECURITY PERMISSIONS / DEPENDENCIES<br>REBOOT / RESTART / RECYCLE<br>CAPACITY<br>CLEAR / REFRESH<br>MAINTENANCE |
| 430 — ARTIFACT TYPE QUALIFIER | SEE FIGURE 5A |
| 440 — SOURCE | |
| 450 — AGE | |
| 460 — IMPACT | DATA INTEGRITY<br>SECURITY<br>RELIABILITY<br>CAPABILITY<br>REQUIREMENTS<br>MIGRATION<br>PERFORMANCE |
| 470 — BUSINESS PROCESS | |
| 480 — OPEN DATE | |
| 490 — FOCUS AREA | SEE FIGURE 5B |

*Fig. 4*

| WHEN ARTIFACT TYPE= | THEN ARTIFACT TYPE QUALIFIER OPTIONS ARE: |
|---|---|
| CONFIGURATION / DEFINITION | • INCORRECTLY DEFINED<br>• MISSING ELEMENTS<br>• CONFUSING / MISLEADING INFORMATION<br>• DEFAULT TAKEN (BUT INADEQUATE)<br>• REQUIREMENT / CHANGE UNKNOWN / NOT DOCUMENTED |
| CONNECTIVITY | • INCOMPATIBILITY<br>• INCORRECTLY DEFINED<br>• CONFUSING / MISLEADING INFORMATION<br>• DEFAULT TAKEN (BUT INADEQUATE)<br>• MISSING ELEMENTS<br>• REQUIREMENT / CHANGE UNKNOWN / NOT DOCUMENTED |
| SYSTEM / COMPONENT COMPLETENESS | • MISSING ELEMENTS<br>• PRESENT-BUT INCORRECTLY ENABLED<br>• PRESENT-BUT NOT ENABLED |
| SECURITY DEPENDENCY | • INCORRECTLY DEFINED<br>• MISSING ELEMENTS<br>• CONFUSING / MISLEADING INFORMATION<br>• RESET OR RESTORE<br>• PERMISSIONS NOT REQUESTED<br>• REQUIREMENT / CHANGE UNKNOWN / NOT DOCUMENTED |
| REBOOT / RESTART / RECYCLE | • DIAGNOSTICS INADEQUATE<br>• RECOVERY INADEQUATE |
| CAPACITY | • INCORRECTLY DEFINED<br>• MISSING (DEFAULT TAKEN)<br>• CONFUSING / MISLEADING INFORMATION<br>• REQUIREMENT / CHANGE UNKNOWN / NOT DUCUMENTED |
| CLEAR / REFRESH | • SCHEDULED<br>• UNSCHEDULED |
| MAINTENANCE | • SCHEDULED<br>• UNSCHEDULED |

*Fig. 5A*

| FOCUS AREA: | COMPRISED OF FAILURES WITH THE FOLLOWING QUALIFIERS: |
|---|---|
| SKILL / TRAINING / PROCESS | • INCORRECT<br>• MISSING<br>• INCOMPATIBILITY<br>• DEFAULT TAKEN (BUT INADEQUATE)<br>• PERMISSIONS NOT REQUIRED |
| COMMUNICATION | • REQUIREMENTS / CHANGE UNKNOWN / NOT DOCUMENTED |
| COMPONENT / SYSTEM | • CONFUSING / MISLEADING INFORMATION<br>• UNSCHEDULED<br>• DIAGNOSTIC INADEQUATE<br>• RECOVERY INADEQUATE<br>• RESET OR RESTORE<br>• PRESENT, BUT INCORRECTLY ENABLED<br>• PRESENT, BUT NOT ENABLED<br>• SCHEDULED<br>• UNSCHEDULED |

*Fig. 5B*

| FIELD | CLASSIFICATION |
|---|---|
| TARGET | CODE / CONTENT - REQUIREMENTS / DESIGN / CODE<br>CODE / CONTENT - BUILD / PACKAGE<br>CODE / CONTENT - USER DOCUMENTATION<br>CODE / CONTENT - NATIONAL LANGUAGE SUPPORT |
| ARTIFACT TYPE | ASSIGMENT / INITIALIZATION<br>CHECKING<br>ALGORITHM / METHOD<br>FUNCTION / CLASS / OBJECT<br>TIME SERIALIZATION<br>INTERFACE / O - O MESSAGES<br>RELATIONSHIP<br>EDITORIAL<br>TECHNICAL<br>NAVIGATIONAL<br>PROCESS CONFORMANCE |

*Fig. 6A*

| FOCUS AREA: | COMPRISED OF FAILURES WITH THE FOLLOWING ARTIFACT TYPE AND ARTIFACT TYPE COMBINATIONS: |
|---|---|
| REQUIREMENTS | • MISSING FUNCTION / CLASS / OBJECT<br>• MISSING INTERFACE / O-O MESSAGES<br>• MISSING TIMING / SERIALIZATION<br>• MISSING RELATIONSHIP |
| HIGH LEVEL DESIGN | • INCORRECT FUNCTION / CLASS / OBJECT<br>• INCORRECT INTERFACE / O-O MESSAGES<br>• INCORRECT TIMING / SERIALIZATION<br>• INCORRECT RELATIONSHIP |
| LOW LEVEL DESIGN | • MISSING ALGORITHM / METHOD<br>• MISSING CHECKING<br>• INCORRECT ALGORITHM / METHOD<br>• MISSING ASSIGMENT / INITIALIZATION |
| CODING / CODE INSPECTION ACTIVITIES | • INCORRECT ASSIGMENT / INITIALIZATION<br>• INCORRECT CHECKING |

Fig. 7A

| TABLE 3B: CALCULATED FIELD LOGIC FOR FOCUS AREA FIELD WHENTARGET = "BUIL / PACKAGE" ||
|---|---|
| FOCUS AREA: | COMPRISED OF FAILURES WITH THE FOLLOWING ARTIFACT TYPE: |
| PROCESS | • PROCESS CONFORMANCE<br>• SHIPPED FILES |
| MERGE / INTEGRATION | • CODE INTEGRATION |
| INPUT SPECIFICATION | • MAINTENANCE / FIX DEPENDENCIES<br>• PACKAGING SCRIPTS<br>• INSTALL / UPGRADE DEPENDENCIES |
| NON-SOFTWARE | • MEDIA |

Fig. 7B

| TABLE 3C: CALCULATED FIELD LOGIC FOR FOCUS AREA FIELD WHEN TARGET = "USER DOCUMENTATION" ||
|---|---|
| FOCUS AREA: | COMPRISED OF FAILURES WITH THE FOLLOWING ARTIFACT TYPE: |
| USEABILITY / EASE OF USE | • EDITORIAL<br>• NAVIGATIONAL |
| SPECIFICATIONS / TECH INSTRUCTION | • TECHNICAL |

*Fig. 7C*

| TABLE 3D: CALCULATED FIELD LOGIC FOR FOCUS AREA FIELD WHEN TARGET = "NATIONAL LANGUAGE SUPPORT" ||
|---|---|
| FOCUS AREA: | COMPRISED OF FAILURES WITH THE FOLLOWING ARTIFACT TYPE: |
| TRANSLATION / INTERPRETATION | • TRANSLATION<br>• LANGUAGE EXPECTATION |
| SOFTWARE CAPABILITY | • CHARACTER HANDLING<br>• USER INTERFACE |
| PROCESS | • ENABLEMENT |

Component 1: FA 1, FA 2, FA 3
Component 2: FA 1, FA 2, FA 3, FA 4, FA 5
Component 3: FA 1, FOCUS AREA 3, FA 2, FA 4, FA 7

NUMBER OF DEFECTS → 1200

Fig. 13

Master Data Configuration: ATQ 1, ATQ 3, ATQ 4, ATQ 5 — 1310
Validity: ATQ 5, ATQ 3
Format: ATQ 1, ATQ 3, ATQ 4, ATQ 5
Migration: ATQ 3, ATQ 7
Corruption: ATQ 1, ATQ 3

NUMBER OF DEFECTS → 1300

DEFECT RESOLUTION METHODOLOGY AND TARGET ASSESSMENT PROCESS WITH A SOFTWARE SYSTEM

CROSS-REFERENCE TO RELATED APPLICATIONS

This application is related to U.S. patent application Ser. No. 11/675,871, entitled "DEFECT RESOLUTION METHODOLOGY AND DATA DEFECTS QUALITY/RISK METRIC MODEL EXTENSION," filed on even date herewith by Kathryn Allyn Bassin et al. This related patent application is herein incorporated by reference in its entirety.

BACKGROUND OF THE INVENTION

1. Field of the Invention

The present invention generally relates to computer systems, and more specifically to the analysis of defects in computer software products.

2. Description of the Related Art

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for software developers.

To improve product quality, many organizations devote an increasing share of their resources to testing and identifying problem areas related to software and the process of software development. Accordingly, it is not unusual to include a quality assurance team in software development projects to identify defects in the software product during, and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC). ODC is a commonly used complex quality assessment schema for understanding code related defects uncovered during testing. However, defects may occur due to a wide variety of reasons, for example, data and environment related factors. Therefore, because ODC is limited to analyzing only code defects it does not provide any meaningful, multifaceted analysis of key focus areas related to software development such as risks of moving the project forward, testing effectiveness, testing efficiency, consumer satisfaction, readiness of a system for production, and the like.

Accordingly, what is needed are improved methods and systems for classifying defects and identifying problem areas in the development cycle.

SUMMARY OF THE INVENTION

The present invention generally relates to computer systems, and more specifically to the analysis of defects in computer software products.

One embodiment of the invention provides a method for analyzing defects associated with a software system. The method generally comprises identifying one or more defects during testing of a software product, classifying each defect into one of a plurality of classes of defects, storing descriptions of each defect in a data structure, wherein the descriptions comprise the classification of the defects, and analyzing a class of defects stored in the data structure to determine a cause for one or more of the defects within the class of defects.

Another embodiment of the invention provides a computer readable storage medium comprising a defect analysis tool which, when executed, performs operations for analyzing defects associated with a software system. The operations generally comprise identifying one or more defects during testing of a software product, classifying each defect into one of a plurality of classes of defects, storing descriptions of each defect in a data structure, wherein the descriptions comprise the classification of the defects, and analyzing a class of defects stored in the data structure to determine a cause for one or more of the defects within the class of defects.

Yet another embodiment of the invention provides a system generally comprising a defect data collection tool, a defect analysis tool, and a data structure coupled with the defect data collection tool and the defect analysis tool. The data structure is configured to receive descriptions of defects identified during testing of a software system from the defect data collection tool, the descriptions comprising a classification of each defect into one of a plurality of classes of defects. The defect analysis tool is configured to access the data structure and analyze a class of defects stored in the data structure to determine a cause for one or more of the defects within the class of defects.

A further embodiment of the invention provides a method for analyzing defects associated with a software system. The method generally comprises installing a defect data collection tool for testing the software project. The defect data collection tool is configured to describe defects identified during testing, the description of each defect comprising a classification of the defect into one of a plurality of predetermined classes of defects, and storing the description of each defect in a data structure. The method further comprises installing a defect analysis tool, the defect analysis tool being configured for analyzing the defects stored in the data structure for determining a cause for one or more of the defects within a class of defects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3A illustrates exemplary artifact types and artifact type qualifiers for data defects according to an embodiment of the invention.

FIG. 3B illustrates exemplary focus areas for data defects according to an embodiment of the invention.

FIG. 4 illustrates exemplary fields of a data structure configured to retain defect data for environment defects, according to an embodiment of the invention.

FIG. 5A illustrates exemplary artifact types and artifact type qualifiers for environment defects according to an embodiment of the invention.

FIG. 5B illustrates exemplary focus areas for environment defects according to an embodiment of the invention.

FIGS. 6A and 6B illustrate exemplary fields of a data structure configured to retain defect data for code defects, according to an embodiment of the invention.

FIGS. 7A-7D illustrate exemplary focus areas for code defects according to an embodiment of the invention.

FIG. 12 illustrates another exemplary bar graph generated during focus area analysis, according to an embodiment of the invention.

FIG. 13 illustrates an exemplary bar graph generated during artifact analysis, according to an embodiment of the invention.

DETAILED DESCRIPTION OF THE PREFERRED EMBODIMENTS

Figure 1:
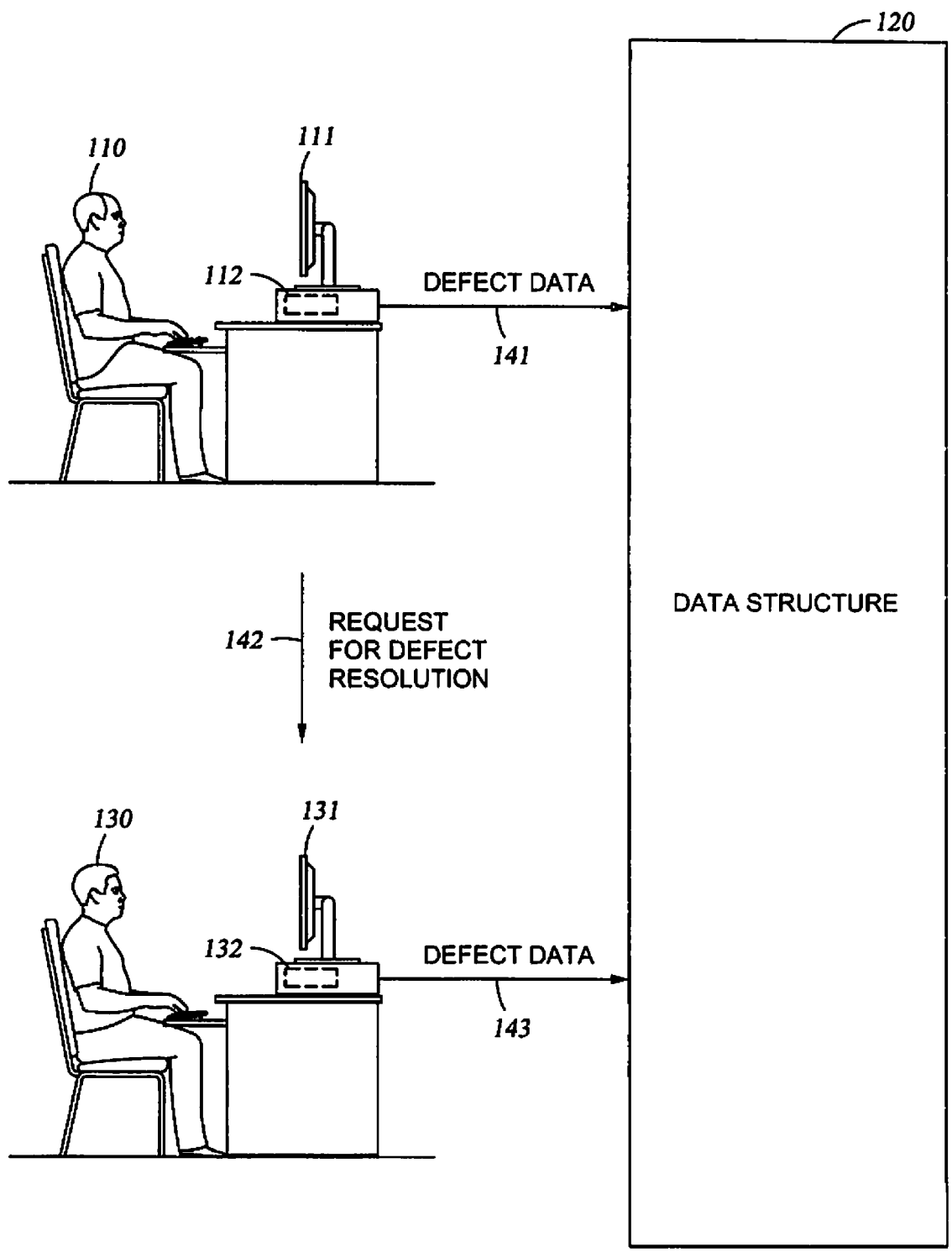
FIG. 1 illustrates an exemplary system for defect data collection and analysis, according to an embodiment of the invention.

Embodiments of the invention are generally related to computer systems, and more specifically to the analysis of defects in computer software products. Defects uncovered during software testing may be stored in a data structure as data defects, code defects, or environment defects, along with further data describing a particular nature of the defects. The defects may be analyzed to determine a particular problem area causing the defects. If a particular class of defects is determined to be the dominant class of defects encountered during testing, an analysis path of that class of defects may be followed to determine a cause for the defects in the respective class. Therefore, corrective measures tailored to resolving the defects associated with the determined cause may be taken.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the system shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

I. DEFECT CLASSIFICATION

In order to analyze defects and derive meaningful data therefrom, defects may be classified, and data related to the defect and resolution of the defect may be collected and stored as the defects are encountered. As previously discussed, defects may occur due to a number of reasons including, but not limited to, erroneous code, erroneous data, erroneous environmental conditions, and the like. Therefore, when a defect is encountered it may be classified as, for example, a code defect, data defect, environment defect, etc. Further descriptions of the defect may also be included to identify a particular nature of the defect.

FIG. 1 is a diagram illustrating an exemplary defect identification process according to an embodiment of the invention. Defects may be identified, for example, by a tester 110 testing a software system. Tester 110 may be, for example, a quality assurance engineer trained to test software products to identify defects. In one embodiment, tester 110 may be a customer using the product. Tester 110 may execute one or more programs or applications associated with the software product on a testing machine 111 configured to test the software product. Upon identifying a defect, tester 110 may store data 141 regarding the identified defect in a data structure 120. For example, in one embodiment, tester 110 may classify the defect as a data defect and store information related to the data defect in data structure 120.

Data structure 120 may be representative of any collection of data regardless of the particular physical representation. By way of illustration, the data structure 120 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Data structure 120 may be contained in any one of computers 111 and 131 shown in FIG. 1. In one embodiment of the invention, data structure 120 may be contained in a server. Computers 111 and 131, and a server containing database 120 may be connected to a network, for example, a Local Area Network (LAN), the internet, and the like, for exchanging defect data.

In one embodiment of the invention, tester 110 may notify a developer 130 of the software product regarding the identified defect. Tester 110 may send a request for defect resolution 142, for example, via email, to developer 130 to notify developer 130 that a defect has been identified. Developer 130 may retrieve the defect data 141 stored in data structure 120 by tester 110 and perform operations to resolve the defect. For example, developer 130 may alter code of the software product, migrate data, include one or more missing components to the software system, and the like. After a defect is resolved, developer 130 may store further data 143 regarding the defect and resolution of the defect in data structure 120.

One skilled in the art will recognize that embodiments of the invention are not limited by the particular process of identifying and resolving defects illustrated in FIG. 1. Generally, any reasonable method for identifying defects associated with a software product, resolving the defect, and storing data regarding the defect and resolution of the defect in a data structure fall within the purview of the invention. For example, in one embodiment, product testing and defect resolution may be performed by the same person, for example, developer 130.

The following sections describe exemplary classification schemes for each of data defects, code defects, and environment defects. One skilled in the art will recognize however, that classification is not limited to the classes identified herein. More generally, any reasonable number and types of classification may be implemented based on the nature of the software system that is tested.

A. Classification of Data Defects

As previously discussed, defects in software products may occur due to a wide variety of reasons. One such reason may be defects in data required for operating the software product. For example, data defects may occur due to factors such as availability, validity, corruption, etc. of data associated with the software product. When a defect emanating from data related issues is identified, the defect may be classified as a data defect and stored in data structure 120. In addition to identifying a defect as a data defect, further descriptions of the particular nature of the data defect may also be stored in data structure 120.

Figure 2:
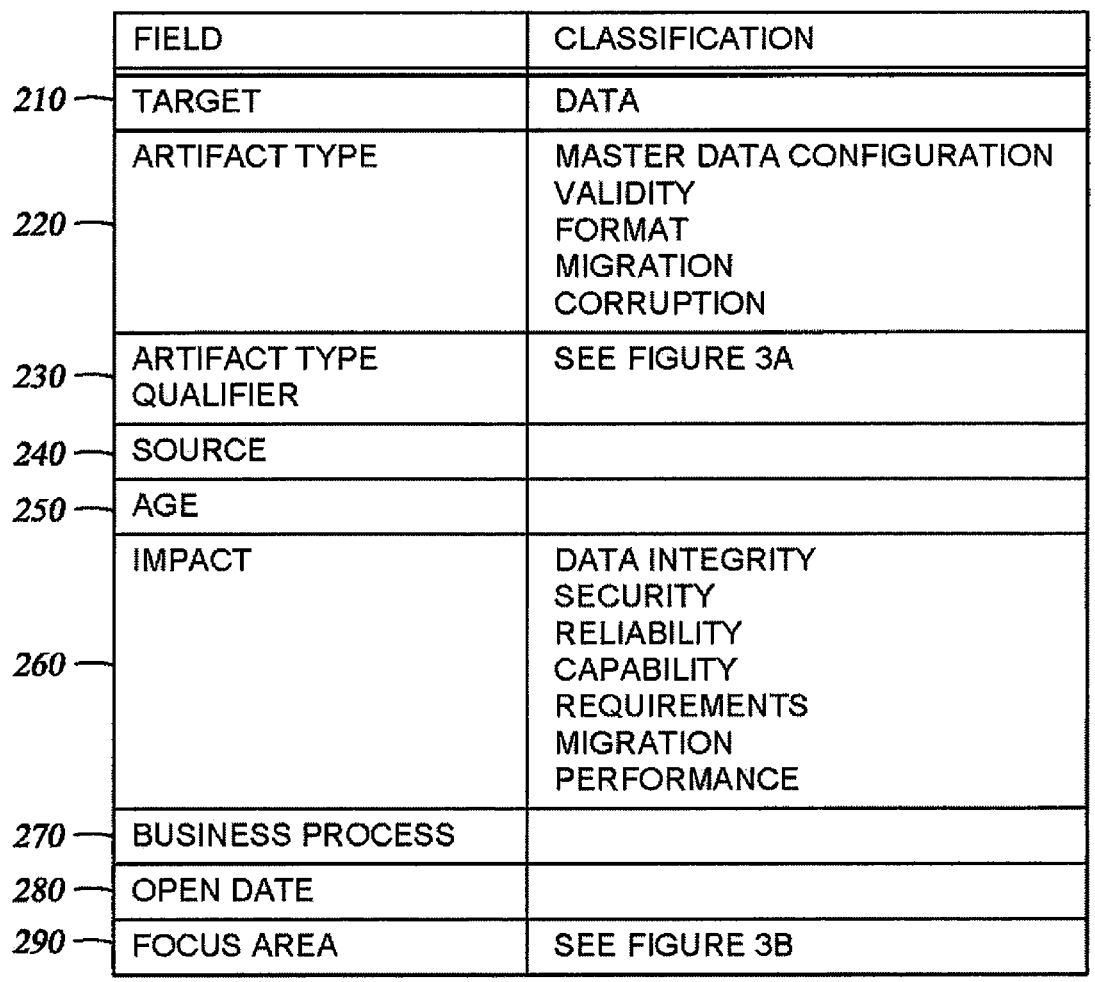
FIG. 2 illustrates exemplary fields of a data structure configured to retain defect data for data defects, according to an embodiment of the invention.

FIG. 2 illustrates an exemplary arrangement of data structure 200 for storing information related to data defects. Data structure 200 may be an example of a data structure 120 of FIG. 1. As illustrated, each entry in data structure 200 may include a plurality of fields for classifying a defect. For example data structure 200 may include a TARGET field 210 for identifying a class of the defect. Defect classes may include, for example, code defects, environment related defects, data defects, and the like. Because data structure 200 illustrates the classification of data defects, the further classification options shown in data structure 200 are related to data defects. For other classes of defects the same or different classification options may be provided.

Data structure 200 may include an ARTIFACT TYPE field 220 to further describe a data defect. Exemplary artifact type descriptions of data defects may include, for example, master data configuration defects, validity defects, format defects, data migration defects, data corruption defects, and the like, as shown in field 220 FIG. 2. A data defect may be described by any one of the artifact types listed above.

Master data configuration defects may result from data associated with a software product being improperly interlocked, coordinated, or otherwise set up. Therefore, data may be added or deleted to a system executing the software product to resolve the defect. For example, the software product may be configured to access a particular database. If the database is not set up and available to the software product, a master data configuration type data defect may occur.

Validity type data defects may occur due to the use of expired, withdrawn, or otherwise incorrectly used data. For example, the software system may access data that is 'old' and no longer valid. This may occur, for example, if the data is altered and the altered data is not available to the software system. Therefore, the software product may access an older version of the data. Validity type data defects may be resolved by making the proper data available to the software system executing the software product.

Format type data defects may arise from the use of an incorrect data format such as, for example, an incorrect date format, character length, character type, and the like. For example, the software product may be configured to prompt a user for a numerical value. However, the software product may be configured to accept only integer type numerical values. If a decimal type data value is entered, the software product may receive incorrect data.

Migration type data defects may occur if data is not migrated correctly, for example, due to a problem with data mapping. Such data defects may be resolved by properly mapping and remigrating data. For example, a software product may be configured to link with a database to retrieve data therefrom. Migration type data defects may occur if an incorrect link is provided, thereby making the database unavailable to the software product. In contrast, Master Data Configuration data defects may occur if the data itself is corrupted.

Corruption type data defects may occur due to unintended changes made to data. For example, an individual data record, or group of data records may be overlaid with another set of data due to some software, logic, or hardware failure. Therefore, the original data must be made available to the software product in order for the software product to function properly.

Data structure 200 may also include an ARTIFACT TYPE QUALIFIER field 230 to further describe the artifact type. FIG. 3A illustrates exemplary artifact type qualifiers for the artifact types shown in field 220 of FIG. 2. For example, the artifact type qualifiers for master data configuration type defects may include data defects arising from incorrect data, missing data, confusing or misleading data provided by a customer, confusing or misleading data provided by the system or a component, and the like.

Artifact type qualifiers for validity type data defects may include data defects arising due to incorrect data, confusing/misleading information, withdrawn data, expired data, and the like. Each of the categories may be further classified based on a source of the error, for example, a component, customer, system, and the like, as illustrated in FIG. 3A.

Artifact type qualifiers for format type data defects may include data defects arising from incorrect data, confusing or misleading data, and the like. Each of these categories may be further classified based on a source of the error, for example, a customer, component, system, or errors created by the test, as illustrated in FIG. 3A. Migration type data defects may be classified as defects arising from incorrect mapping of data, missing mapping of data, and the like, as illustrated in FIG. 3A.

Artifact type qualifiers for corruption type data defects may be classified based on knowledge of the source of corruption and whether a correction was made to prevent the source of corruption. Corruption sources may include, for example, customers, system, component, and errors created by test, as illustrated in FIG. 3A.

Data structure 120 may further include a focus area field 290. Focus area field 290 may identify a particular area in which improvements to the software development process may be made to obviate the occurrence of defects. In one embodiment of the invention focus area field 290 may be calculated based on the input in one or more of fields 210-280. Exemplary focus areas may include Skills/Training/Process, communication, components/system, and customers, as illustrated in FIG. 3B.

Each identified focus area may include a further description a particular aspect of the focus area affected by the defect. For example, referring to FIG. 3B, Skills/Training/Process may require improvements to avoid data defects resulting from one of incorrect, missing, expired/overlooked, withdrawn/overlooked data, and the like. Communications may be improved to properly communicate information regarding one of expired and withdrawn data between any one of customers, components, the system, etc., as illustrated in FIG. 3B.

The component/System focus area may require improvements to avoid data defects arising known corruption sources, unknown corruption sources, and confusing or misleading information provided by a component/system, as illustrated in FIG. 3B. The customer focus area may require improvements to avoid data defects arising known corruption sources, unknown corruption sources, and confusing or misleading information provided by a customer, as illustrated in FIG. 3B.

B. Classification of Environment Defects

FIG. 4 illustrates a data structure 400 for classification of environment defects. Data structure 400 may be an example of a data structure 120 of FIG. 1. Accordingly, data structure 400 is shown having a target field 410 set to environment defect. Therefore, the remaining fields in data structure 400 are shown with classification options for environment defects.

An artifact type field 420 may provide options for further defining an environment defect. Exemplary artifact types for environment defects may include, for example, environment defects that arise as a result of errors in configuration/definition, connectivity, system or component completeness, security permissions or dependencies, reboot/restart/recycle, capacity, clear/refresh, maintenance, and the like, as shown in FIG. 4.

A configuration/definition type environment defect may arise due to, for example, incorrect scripts used to bring up the environment, missed table entries, and the like. Therefore, changes may be made to the definition or configuration of the environment to resolve the defect.

Connectivity type environment defects may arise if incorrect or incomplete scripts are defined between and across systems. For example, a first component of a system may be incompatible with a second component of the system, thereby preventing a proper connection between the components. Such connectivity defects may be resolved by, for example, installing appropriate software or upgrading the components to allow connectivity. Connectivity type code defects may also arise from improperly defined protocols for communication between components. Therefore, such connectivity defects may be corrected by defining an appropriate protocol.

System or component completeness type environment defects may arise for example, if a particular functional capability is delivered to a software system, but the functional capability is not present in a component or the system because it is not added properly, corrected, or enabled. Such errors may result from defects in the build/package code for the software system rather than improper configuration. Accordingly, the building or integration code for the system may be altered to resolve the error.

Security permissions or dependency type environment defects may arise if system access is blocked due to password or certification non compliance or non-enabled firewall permissions, for example. Accordingly, the passwords, certification, firewall permissions, and the like may be reset or enabled to allow appropriate access to the system.

Reboot/restart/recycle type environment defects may arise if some system component or process required restart to clear an erroneous condition. The specific reason for the erroneous condition may or may not be known, however, code changes may not have been made to resolve the error.

Capacity type environment defects may arise due to a lack of system capacity to handle a particular condition. For example, sufficient drive space or sessions may not be available to the system to handle a particular task.

Clear and refresh type environment defects may arise if a system cleanup is required to clear out or reset resources to resolve the error. For example, files and logs may be emptied or dumped in order to resolve the defect.

Maintenance type environment defects may arise after an upgrade, fixing, of the system, resolution of a failure and the like.

FIG. 5A illustrates exemplary artifact type qualifiers for the environment defect artifact types described above. The artifact type qualifiers may further describe the environment defect artifact types. For example, artifact type qualifiers for configuration/definition defects may include environment defects arising from configuration/definition that is incorrectly defined, has missing elements, includes confusing or misleading information, has an inadequate default status, has a requirement, unknown change or missing documentation, and the like, as shown in FIG. 5A.

Artifact type qualifiers for connectivity defects may include, for example, defects arising from incompatibility, incorrectly defined environment, confusing or misleading information, environment with an inadequate default status, environment with missing elements, missing requirements, unknown changes, missing documentation, and the like as illustrated in FIG. 5A.

Artifact type qualifiers for system and component completeness based defects may include, for example, defects arising from missing elements, elements that are present but incorrectly enabled, elements that are present but not enabled, and the like, as illustrated in FIG. 5A.

Artifact type qualifiers for security dependency type environment defects may include defects arising from, for example, incorrect definitions, missing elements, confusing or misleading information, a reset or restore event, permissions not being requested, missing requirements, unknown changes, missing documentation, and the like as illustrated in FIG. 5A.

Artifact type qualifiers arising from reboot, restart or recycle type environment defects may include, for example, defects arising from inadequate diagnostics or inadequate recovery. Artifact type qualifiers for capacity type environment defects may include, for example, defects arising from incorrect definitions, missing elements (where a default configuration is used), confusing or misleading information, missing requirements, unknown changes, missing documentation, and the like as illustrated in FIG. 5A.

Artifact type qualifiers for clear/refresh type environment defects and maintenance type environment defects may include, for example, defects arising from scheduled and unscheduled events, as illustrated in FIG. 5A.

Data structure 400 is also shown with a focus area field 490. Focus area field 490 may identify a particular area in which improvements to the software development process may be made to obviate the occurrence of defects. In one embodiment of the invention focus area field 490 may be calculated based on the input in one or more of fields 410-480. Exemplary focus areas for environment defects may include Skills/Training/Process, communication, components/system, and the like, as illustrated in FIG. 5B.

Each identified focus area may include a further description of a particular aspect of the focus area affected by the defect. For example, referring to FIG. 5B, exemplary descriptions for Skills/training/process focus area may include incorrect, missing, incompatible, default taken (but inadequate), permissions not requested, and the like, as illustrated in FIG. 5B. The communications focus area may address defects associates with requirements, unknown changes, and improper documentation, as illustrated in FIG. 5B.

Exemplary descriptions for the component/system focus area may include, for example, confusing or misleading information, unscheduled, diagnostics inadequate, recovery inadequate, reset or restore, present but incorrectly enabled, present but not enabled, scheduled, unscheduled, and the like, as illustrated in FIG. 5B.

C. Classification of Code Defects

Figure 6B:
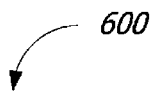

FIGS. 6A and 6B illustrates data structure 600 for classification of code defects. Data structure 600 may be an example of data structure 120 of FIG. 1. Accordingly, data structure 600 is shown having a target field 620 for specifying a type of code defect. One or more classification options for code defects may be provided in target field 620. Exemplary types of code defects may include, for example, code defects arising from errors in requirements, design or code; code defects arising from errors in building or packaging; code defects arising from errors in user documentation; and code defects arising from errors in national language support. Requirements, Design/Code defects are errors in the functional aspect of the software itself, whereas Build/Package defects are errors in the setup (nonfunctional) of the software system. User Documentation defects occur in user guides and/or user help texts, and National Language Support defects address multi-lingual translation issues.

Because data structure 600 illustrates code defects, the remaining fields in data structure 600 are shown with classification options for code defects. For example, an artifact type field 620 may provide options for further defining code defects. Exemplary artifact types for code defects may include, for example, code defects that arise as a result of errors in assignment/initialization, checking, algorithms/methods, functions/classes/objects, timing/serialization, Interface/Object Oriented (O-O) messages, relationships, editorials, technical problems, navigational problems, process conformance, code integration, Maintenance/fix dependencies, incorrectly shipped files, packaging of scripts, Install/upgrade dependencies, media, translation, character handling, user interfaces, language expectations, enablement, and the like, as shown in FIGS. 6A and 6B.

An assignment or initialization type code defect may arise, for example, as a result of incorrectly assigned values or is the values are not assigned at all. Checking type code defects may arise due to errors caused due to missing parameters or incorrect validation of parameters of data in conditional statements.

Algorithm and method type code defects may arise due to problems with an algorithm or a data structure. Such defects may be resolved by rewriting the algorithm or data structure. Such rewriting may be done without changes to the design of the product.

Function, class or object type code defects may be caused due to errors in component interfaces, global data structures and the like. Because such defects may affect overall capability of the system, resolving such defects may require changes to system design. Accordingly, an appropriate request for design change may be made to resolve the defect.

Timing and serialization type code defects may arise because, for example, necessary serialization of a shared resource was either missing, incorrect, or using an improper technique. Interface and O-O message type code defects may arise due to communication problems between modules, components, device drivers, objects, functions, and the like.

Relationship type code defects may arise due to problems related to associations among procedures, data structures, objects, and the like, based on conditions set on the association. Editorial code defects may arise due to defects in grammar, spelling, punctuation, organization, and the like. Technical code defects may be related to a description of the product.

Navigational data defects may include defects that prevent users from finding needed information. Process conformance type code defects may arise from problems with the build procedure, for example, when the build procedure is not specified or followed correctly.

Code integration defects may include defects in one area of code that cause a build or execution break in another area of code. Maintenance and fix dependency type code defects may result from bad packaging of a fix due to incomplete dependency checking, or due to modules being built in an incorrect sequence.

Shipped files type data defects may arise due to problems such as dual ownership of shipped files, system errors, and the like. Packaging scripts type code defects may arise from problems with scripts used during installation, de-installation, upgrade, migration, and the like.

Install or upgrade dependency defects may arise from problems with components or elements upon which an installation or upgrade is dependent. Media type code defects may arise from problems with the package used to distribute software, for example, due to data overrun errors on CD-ROMs.

Translation type code defects may arise from, for example, missing or incorrect translation of help information across multiple languages. Character handling type code defects may arise from errors that result in an inability of the product to correctly handle characters associated with another language.

User interface type code defects may arise from errors that result in an inability of the user interface to function or display correctly in another language. Language expectation defects may arise from incorrect language input or output. For example, a command or program may check for an input or output in the English or a local language. If an incorrect language is used, a defect may be encountered. Enablement type code defects may arise if the product is not designed or implemented correctly to enable national language support.

In one embodiment of the invention, the artifact type qualifiers for code defects may be the same as artifact type qualifiers used in orthogonal defect classification (ODC). For example, artifact type qualifiers for code defects may include, for example, missing, incorrect, extraneous and the like, to describe each of the above artifact types. One skilled in the art will recognize however, that additional artifact type qualifiers may also be defined.

Data structure 600 is shown with a focus area field 690. Focus area field 690 may identify a particular area in which improvements to the software development process may be made to obviate the occurrence of code defects. In one embodiment of the invention focus area field 690 may be calculated based on the input in one or more of fields 610-680.

Each identified focus area may include a further description of a particular aspect of the focus area affected by the defect. FIGS. 7A-7D illustrate exemplary focus areas and descriptions for each type of code defect. Specifically, FIG. 7A illustrates exemplary focus areas that may be generated for code defects of type requirements, design or code. As illustrated in FIG. 7A, code defects of type requirements, design or code may include general focus areas such as requirements, high level design, low level design, coding/code inspection activities, and the like.

The requirements and the high level design focus areas may be further defined based on missing function/class/object, missing interface/O-O messages, missing timing or serialization, missing relationship, and the like as illustrated in FIG. 7A. The low level design focus area may be further defined based on missing algorithm/method, missing checking, incorrect algorithm/method, missing assignment or initialization and the like, as illustrated in FIG. 7A. The coding and coding inspection activities focus area may be further defined based on incorrect assignment or initialization, incorrect checking, and the like, as illustrated in FIG. 7A.

FIG. 7B illustrates exemplary focus areas and focus area descriptions for code defects of type build or package. As illustrated in FIG. 7B, code defects of type build or package may generally include focus areas such as process, merge/integration, input specification, non software, and the like.

The process focus area may be further classified as affecting process conformance or shipped files, as illustrated in FIG. 7B. The merge/integration focus area may affect code integration as illustrated in FIG. 7B. The input specification focus area may be further defined as affecting maintenance/fix dependencies, packaging scripts, install/upgrade dependencies, and the like as illustrated in FIG. 7B. The non-software focus area may be classified as affecting media as illustrated in FIG. 7B.

FIG. 7C illustrates exemplary focus areas for code defects of type user documentation. General focus areas for code defects of type user documentation may include usability or ease of use, specification or technical instruction, and the like, as illustrated in FIG. 7C. The usability focus area may be further defined as editorial or navigational, for example. The specification/technical instruction focus area may be defined as technical as illustrated in FIG. 7C.

FIG. 7D illustrates exemplary focus areas for code defects of type national language support. As illustrated in FIG. 7D, focus areas for code defects of type national language support may generally include Translation/interpretation, software capability, process, and the like. The translation/interpretation focus area may be further defined as affecting translation or language expectation as illustrated in FIG. 7D. The software capability focus area may be further defined as affecting character handling or user interfaces as illustrated in FIG. 7D. The process focus area may be further defined as affecting enablement as illustrated in FIG. 7D.

Data structure 120, for example data structures 200, 400, and 600 may include a source field (see fields 240, 440, and 640 respectively in FIGS. 2, 4, and 6) and an age field (see fields 250, 450, and 650 respectively in FIGS. 2, 4, and 6). The source field may identify a particular source of an error, for example, a component or application to which a defect may be attributed. The age field may describe a time characteristic of the defect, for example, 'old', and 'new'. For example, a defect may be a recurring defect that has continued to occur over an extended period of time. Such defects may be classified as 'old defects'. In one embodiment of the invention, the source field and age field may be inapplicable to data defects, and therefore, may be left blank.

Data structure 120 may also include an impact field (see fields 260, 460, and 660 respectively in FIGS. 2, 4, and 6). The impact field may identify a characteristic of the software product that may be affected as a result of the defect. For example, impacted areas may include data integrity, security, reliability, capability, requirements, migration, performance, and the like, as illustrated in FIG. 2.

In one embodiment, data structure 120 may include a business process field (see fields 270, 470, and 670 respectively in FIGS. 2, 4, and 6). The business process field may identify business process or function level assessment information. For example, the business process field may identify a particular task during which the error was detected. In one embodiment of the invention, the business process field may be optional, and therefore, an entry may not be necessary to describe the defect. Data structure 120 may also include an open date field (see fields 280, 480, and 680 respectively in FIGS. 2, 4, and 6). The open date field may indicate the date on which a defect was detected.

One skilled in the art will recognize that the particular artifact types, impact areas, artifact type qualifiers, and focus areas described herein are not limiting on the invention. Rather, any reasonable classification of defects including, for example, defining or computing any combination of a target, an artifact type, an artifact type qualifier for the artifact type, focus area, impact, business process, and the like may be utilized based on a particular nature of a software product.

In one embodiment of the invention, a person storing defect data into data structure 120 may launch a defect data collection tool 112 to enter defect data. The defect data collection tool may display one or more graphical user interface screens configured to receive defect data. For example, a graphical user interface screen may provide drop down boxes, text areas, check boxes, and the like, to allow a user to select a particular defect class, artifact type, artifact type qualifiers, impact areas and the like.

II. ANALYSIS OF CODE DEFECTS

As previously discussed, data related to each defects and the resolution of each defect may be stored in a data structure 120. The defect data in data structure 120 may be analyzed to determine problem areas in the software and/or the software development process. Crucial data derived from the defect analysis may include, for example, readiness to move to a next phase of development, an impact of the defects, customer satisfaction, need for additional training of personnel, need for additional components/functionality, and the like. By deriving such crucial data from the analysis of defects, strategic decisions may be made to devote appropriate resources to reduce future defects and identify, predict, and mitigate risks associated with a software product.

Referring back to FIG. 1, computer 131 may include a defect analysis tool 132 for analyzing the defect data stored in data structure 120. For example, defect analysis tool 132 may be configured to compile the data stored in data structure 120 and generate graphs, pie charts, and other representations of the characteristics of defects stored in data structure 120. The representations may indicate, for example, one or more problem areas associated with a software product. While the defect analysis tool is shown in computer 131, one skilled in the art will recognize that defect analysis tool 132 may be contained in any computer containing or having access to data structure 120. For example, the defect analysis tool may be contained in a computer operated by a manager of a software development project. The manager may use the defect analysis tool 120 to devise strategies to improve quality, reliability, etc. of a software product.

In general, analysis of defects may begin by analyzing a distribution of targets to determine a target area to which a majority of the defects are related. For example, the target area analysis may include determining whether the defects are primarily related to code related problems, data related problems or environment related problems. If a majority of defects fall under a particular target area, an analysis path for that target area may be followed.

Figure 8:
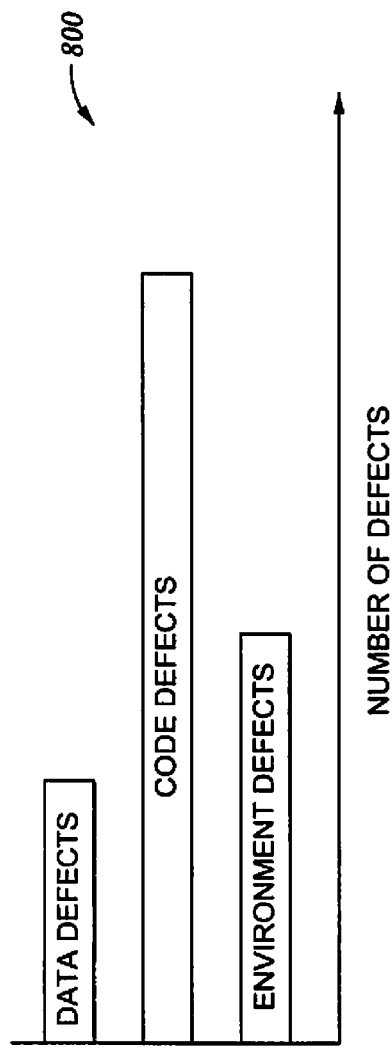
FIG. 8 illustrates an exemplary bar graph generated to analyze defects according to an embodiment of the invention.

For example, FIG. 8 illustrates a bar graph 800 showing an exemplary distribution of defects across target areas. As illustrated in FIG. 8, the x-axis may measure the number of defects, therefore the relative lengths of the bars representing each target area may indicate the predominant target area. For example, in FIG. 8 code defects are the dominant class of defects based on the relative lengths of the bars. This section describes an exemplary analysis path for code defects according to an embodiment of the invention.

If the distribution of defects is relatively even among the target areas, a target area by open data analysis may be performed to determine a target area that has pervasive or increasing number of defects. The target area by open date analysis is described in greater detail below.

If code defects dominate, the defects may be arising from weaknesses in code, content, and/or design deficiencies of the overall system development/integration project. For examples, the weaknesses may be related to requirements, high level design, low level design, coding or code inspection activities, and the like. Accordingly, and analysis path for code defects may be followed to determine a cause for the code defects and solutions to resolve the defects.

A. Focus Area Analysis

Analysis of code defects may begin with a focus area analysis of the code defects. The focus area analysis may determine a particular focus area under which a predominant number of defects fall. Based on the predominant focus area, corrective actions may be takes to resolve or obviate the defects. In one embodiment of the invention, defect analysis tool 132 may generate and display a suggested course of action based on the focus area analysis.

Figure 9:
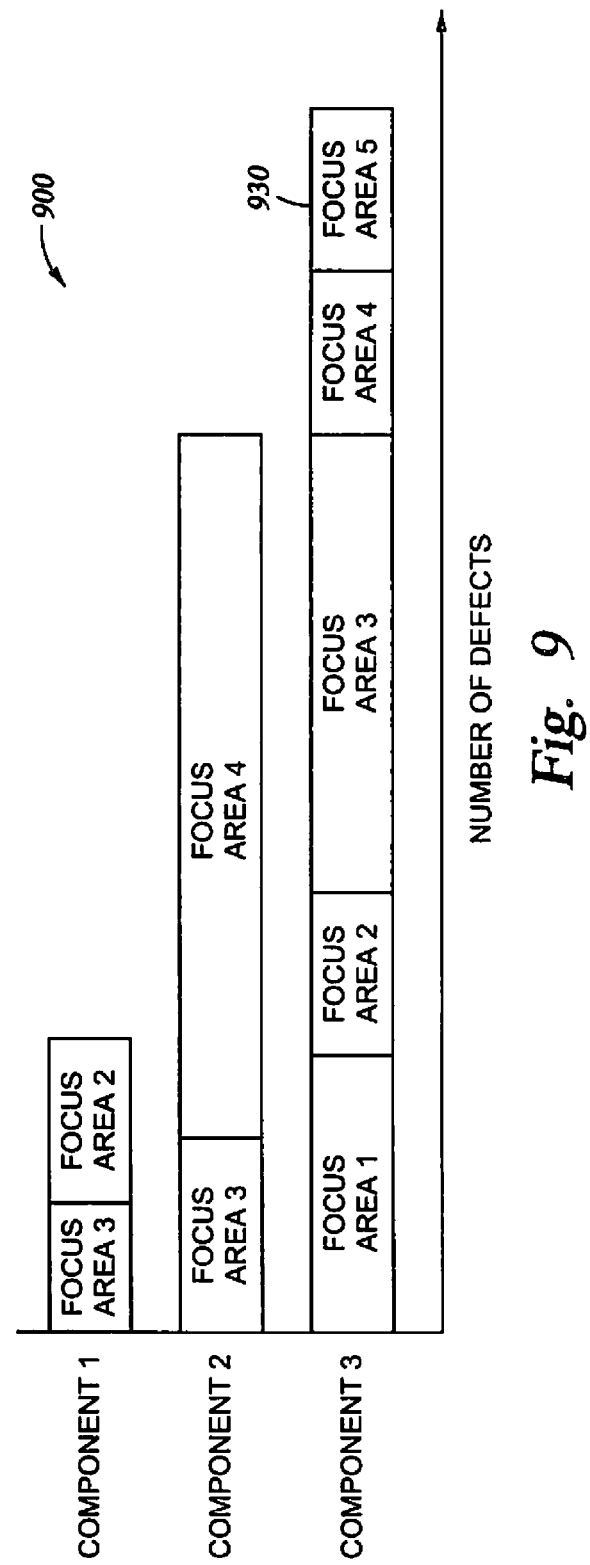
FIG. 9 illustrates an exemplary bar graph generated during focus area analysis, according to an embodiment of the invention.

The focus area analysis may be performed based on one or more criteria. For example, the focus area of defects may be analyzed for each component, business process, or by date/time. FIG. 9 illustrates an exemplary bar graph 900 generated by defect analysis tool 132 to illustrate distribution of defects across one or more focus areas for each component. For example bar graph 900 illustrates the distribution of defects for components 1, 2, and 3.

Each bar in FIG. 9 may be associated with a component of the system and may indicate the number of defects associated with the component based on the length of the bar. Furthermore, each bar may also display the specific focus areas affected by the defects for a component. For example, bar 930 illustrates the defects for component 3 in FIG. 9. As illustrated bar 930 is divided into one or more focus areas. The length of the bar devoted to each focus area may be proportional to the number of defects associated with the focus area. For example, the majority of defects associated with component 3 may be associated with focus area 3, as illustrated in FIG. 9. On the other hand relatively few errors associated with component 3 may affect focus area 2. Accordingly, the greatest area/length of the bar is devoted to focus area 3, and a relatively smaller area/length of the bar is devoted to focus area 2.

Similar charts may be generated to identify dominant focus areas for business processes, particular dates, and the like. By identifying the dominant focus areas for each component, for example, corrective actions may appropriately be taken to obviate errors associated with the component. For example, because focus area 3 is the dominant focus area for component 3 in FIG. 9, corrective actions may be taken to avoid defects affecting focus area 3 in component 3.

In one embodiment of the invention, a predetermined plan of action may exist to cure defects associated with a particular focus area. The predetermined plan of action may be generated by defect analysis tool 132 and displayed to a user, for example, a manager of the software development project, or be determined by the manager or other person themselves.

Analysis of defects may be performed at various stages in a software development project. For example, defect analysis may be performed to determine an interim progress/risk assessment, a phase exit risk assessment, and future improvements of a software product. Interim progress/risk assessment may be performed at any time during development, but prior to completion of the software development project. Phase exit risk analysis may be performed at the completion of a particular phase/task, or when a predetermined milestone is reached, to determine a risk of moving forward with development. Phase exit risk may also indicate whether measures taken to correct defects during a particular phase were effective. Interim progress/risk assessment and phase exit risk analysis may generally determine particular problem areas to which resources may be devoted to more effectively and efficiently complete the software development project while maintaining quality and reliability.

Future improvement analysis may be performed to determine improvements for future versions of a software product. For example, a first version of a software product may be developed and marketed. A future improvement analysis may be performed on the first version to determine improvements for a second version of the software product.

In one embodiment of the invention, if the dominant focus area for code defects is requirements, the defect may be occurring due to a missing, incomplete, and/or incorrect functional requirement. If a significant number of requirements related defects are found early in a test cycle, the occurrence of defects is likely to remain high throughout the test and the system may likely be unstable.

If requirements related defects are pervasive across multiple components and/or through the duration of the test, the risk that the system will fail to meet customer needs and end user expectation may be high. Furthermore, the pervasive defects may indicate delays in the schedule for completion of the test or project.

If requirements related defects predominate during interim progress and risk analysis, a project manager may be notified as soon as possible so that risk mitigation for key components and/or business processes may be initiated and implemented. If requirements related defects predominate during phase exit risk analysis, additional testing may be performed to mitigate the risk of encountering defects.

If requirements related defects predominate during future improvement analysis, components or business processes associated with the bulk of the errors may be isolated and additional requirements, development and/or management resources may be devoted to the isolated components in future releases. In some embodiments, the future improvement analysis may be used to determine late changes in a current project based on a cost of implementing the change and the affect of the change on the functionality of the system.

If high level design related defects predominate, the defects may be occurring due to problems with high level system design. For example, the necessary features, functions, and/or interfaces of the system may not be correctly defined. If a significant number of high level design related defects are found early in the test cycle, it may likely that the occurrence of defects throughout the system may remain high and that the system is likely to be unstable. If high level design related defects are pervasive across multiple components or throughout the duration of a test, it may be likely that the system will fail to meet customer expectations. The pervasive nature of the defects may also indicate project delays to resolve the defects.

If high level code design related defects are predominant during an interim progress and risk assessment, a project manager may be notified as soon as possible so that risk mitigation for key components and business processes may be implemented. If high level code design related defects predominate during phase exit risk analysis, additional testing may be performed to mitigate the risk of encountering defects.

If high level code design related defects predominate during future improvement analysis, components or business processes associated with the bulk of the errors may be isolated and additional requirements, development and/or management resources may be devoted to the isolated components in future releases. In some embodiments, the future improvement analysis may be used to determine late changes in a current project based on a cost of implementing the change and the affect of the change on the functionality of the system.

If low level code design related defects dominate, the defects may be occurring due to low level system design problems such as incorrect definition of detailed implementation of necessary features, functions, and interfaces of the system. If low level code design defects dominate or are pervasive across multiple components or through time during interim progress and risk assessment or phase exit risk assessment, it may indicate that customer satisfaction with the product may be negatively impacted. Additional testing may therefore be implemented.

If low level code design related defects dominate or are pervasive across multiple components or through time during future improvement assessment, it may also indicate that customer satisfaction with the product may be negatively impacted. In one embodiment, components or business processes associated with the bulk of the errors may be isolated and additional requirements, development and/or management resources may be devoted to the isolated components in future releases. In some embodiments, the future improvement analysis may be used to determine late changes in a current project based on a cost of implementing the change and the affect of the change on the functionality of the system.

If coding or code inspection activities related defects dominate, the defects may be occurring due to errors in the code that may not have been corrected by pre-test code inspection activities. If coding or code inspection activities related defects dominate or are pervasive across components or over time during interim progress and risk assessment or phase exit risk assessment, coding or code inspection processes may need additional focus.

If coding or code inspection activities related defects dominate or are pervasive across components or over time during future improvement assessment, coding or code inspection processes for the next release may need additional focus. In one embodiment, components or business processes associated with the bulk of the errors may be isolated and additional requirements, development and/or management resources may be devoted to the isolated components in future releases. In some embodiments, the future improvement analysis may be used to determine late changes in a current project based on a cost of implementing the change and the affect of the change on the functionality of the system.

B. System Stability/Completeness Analysis

Figure 10:
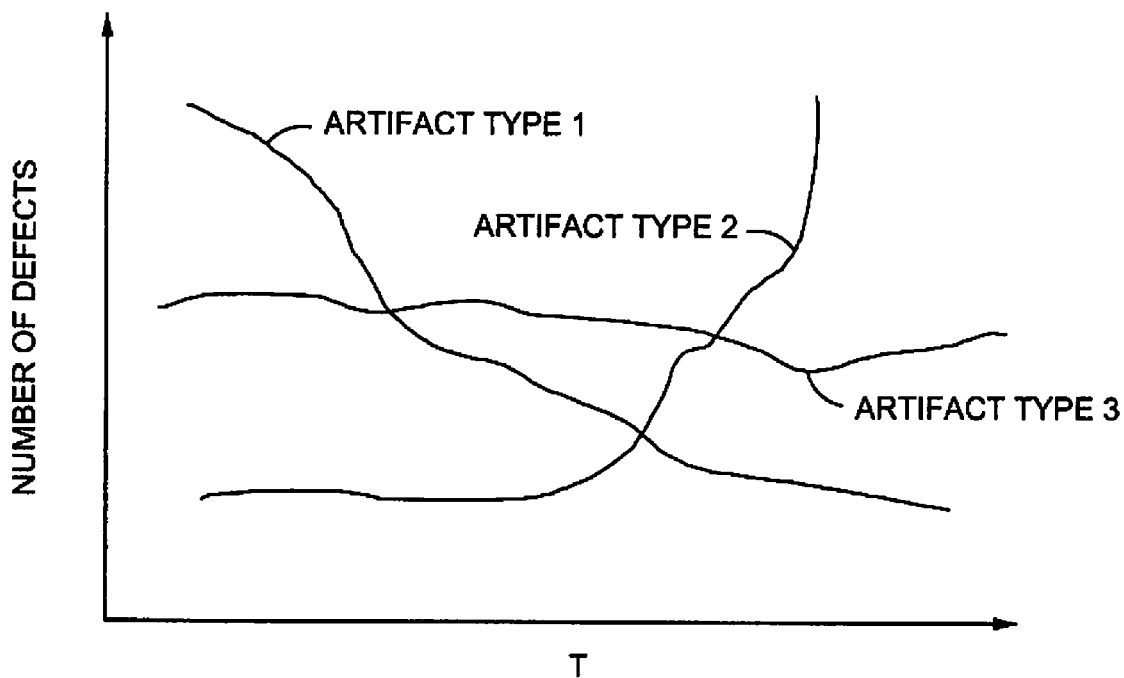
FIG. 10 illustrates an exemplary graph generated to determine the trends of artifact types over time, according to an embodiment of the invention.

In one embodiment of the invention, a system stability/completeness analysis may be performed in addition to or instead of the focus area analysis. System stability/completeness analysis may involve performing an artifact type by open data analysis. In other words, the trend of a particular artifact type over time may be investigated. For example, FIG. 10 illustrates an exemplary chart illustrating the trend of artifact types 1, 2 and 3 over time (x-axis). As illustrated in FIG. 10, the number of defects related to artifact type 1 decrease over time, the number of defects related to artifact type 2 increase over time, and the number of defects related to artifact type 3 stay relatively stable.

In one embodiment of the invention if function/class/object related defects dominate, then the defects may be arising from high level code design issues. Accordingly, one or more predefined actions, such as the actions outlined above, for high level code design problems may be implemented.

In one embodiment of the invention, if algorithm/method related defects dominate, then the defects may be arising from requirements or low level code design issues. If algorithm/method type defects dominate it may be beneficial to investigate the trends of these defects over time. If the defects increase over time, it may indicate that high level design or detail level design code issues may not have stabilized through the system and/or that requirements were not well defined, interlocked and/or executed. The algorithm/method defects may also indicate that the risk of moving to production without additional quality assurance measures may be very high.

In one embodiment of the invention, if assignment/initialization and checking related defects dominate, it may indicate basic coding problems, the occurrence of which ideally would decrease over time. If high proportions of these defects are encountered, it may indicate that early defect removal activities such as pre unit test code inspections, unit testing, and the like may be ineffective. Remedial measures may accordingly be taken to improve the defect removal activities. Assignment/initialization and checking defects may also occur when there are frequent and significant code changes, churning during or throughout the test phase, and the like.

In one embodiment of the invention, if function/class/object, timing/serialization, interface/O-O messages, and/or relationship related defects dominate or grow over time, it may indicate that major changes may be occurring to the product, that the product may be unstable, and that a significant amount of retesting may be required.

In one embodiment of the invention, system stability/completeness analysis may include performing an artifact type qualifier by open data analysis. Artifact type qualifier by open date analysis may be similar to the artifact type by open date analysis described above and may determine a particular artifact type qualifier description for the defects. In one embodiment, if missing related defects dominate or increase over time, it may indicate that the product is incomplete or that it is changing in significant ways, thereby making testing ineffective. It may further indicate that additional quality assurance measures may be required to adequately test the product and ensure customer satisfaction.

In one embodiment of the invention, system stability/completeness analysis may include performing a severity by open date analysis. The severity of a defect may be entered into database 120 at the time of identification or resolution of the defect. In one embodiment, if the severity of defects decreases over time, it may indicate diminishing risk of high impact defects occurring during production for the customer. In one embodiment, if the severity of defects are growing over time, particularly during the end of the test, phase exit or production decisions may be reevaluated.

C. Customer Satisfaction Analysis

In one embodiment of the invention, analyzing code defects may involve performing a customer satisfaction analysis based on the defects collected in data structure 120. The customer satisfaction analysis may determine whether a customer using the product is likely to face defects in the product which may in turn affect customer satisfaction.

In one embodiment of the invention, customer satisfaction analysis may involve performing an impact by open date assessment. The impact by open date assessment may indicate the trends of defects in particular impact areas over time. As discussed earlier exemplary impact areas may include, for example, data integrity, security, reliability, capability, requirements, migration, performance, and the like, as illustrated in FIG. 2. The impact area for each defect may have been defined at the time of discovery or resolution of the defect.

Figure 11:
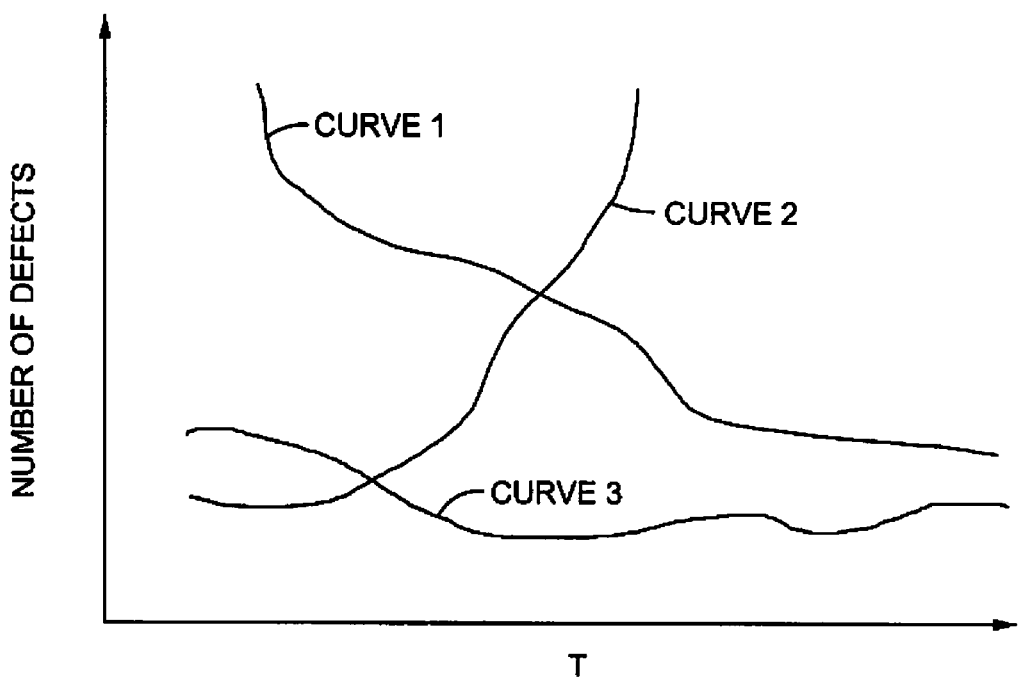
FIG. 11 illustrates another exemplary graph generated during trends over time over time according to an embodiment of the invention.

FIG. 11 is a graph 1100 illustrating exemplary behavior of defects in particular impact areas over time. Graph 1100 measures time along the x-axis and the number of defects along the y-axis. Curve 1 illustrates the behavior of defects in impact area 1, curve 2 illustrates the behavior of defects in impact area 2, and curve 3 illustrates the behavior of defects in impact area 3. As illustrated in FIG. 11, the defects decrease over time for impact area 1, increase over time for impact area 2, and stay relatively stable for impact area 3.

In one embodiment of the invention, if defects related to reliability increase or persist over time, it may indicate an increased risk and cost of completing the testing activities and that the system is unstable. The instability of the system may indicate that customer satisfaction may be poor. Reliability defects may be the most severe defects encountered. Therefore, resolving the defects may warrant additional resources, time, and expense.

In one embodiment of the invention, if capability related defects increase or persist over time, it may indicate that the system is not meeting its requirements or that significant changes are being made to the product, thereby causing defects. Because capability related defects are also likely to affect customer satisfaction, an artifact type analysis may be performed for the capability defects to determine a cause of the defects. Therefore, appropriate measures may accordingly be takes to resolve the defects.

In one embodiment of the invention, a large number usability related defects that increase or persist over time, may indicate poor customer satisfaction. However, usability defects may be low severity, therefore, as long as the reliability and capability related defects are relatively low, it may indicate that the system is relatively stable.

D. Test Effectiveness/Coverage Analysis

In one embodiment of the invention, code defect analysis may involve performing a test effectiveness and test coverage assessment. The test effectiveness/test coverage analysis may determine whether the product is adequately tested and whether the resolution of defects during testing was effective in resolving the defects.

In one embodiment of the invention, the test effectiveness/test coverage analysis may involve performing a trigger by open date analysis. Triggers may be specific conditions present during testing of a software product, for example, simple triggers, such as Coverage and Variation typically arise earlier in a test phase. In contrast, the more complex triggers, such as dynamic interaction among various functions, can only be exercised later in the test after the system has stabilized in a basic way.

In general, it may be desirable to see a gradual shift of errors from simple, single function triggers such as coverage and variation to more complex triggers such as sequencing and interaction and/or system test triggers if a system test is performed. However, if a large number of simple trigger defects occur during testing, and particularly defects related to coverage, this may indicate that the system is not yet stable. This may further indicate that a significant portion of the time in particular phase may be used to resolve the simple trigger defects, thereby causing the more complex defects to remain unaddressed during phase exit, transition, or production.

If most defects are related to variation, it may indicate mature use of the systems functionality. Therefore, significant distribution of defects related to the variation trigger may indicate that the testing effort was comprehensive and effective, and that the customer is more likely to be satisfied with the resulting system in production. If most of the defects are consistently dominated by coverage and variation triggers late in a phase, then it may indicate a high risk of both simple and complex triggers escaping into the next phase or production.

In one embodiment of the invention, the test effectiveness/coverage analysis may involve performing a code age by trigger analysis. Code age may determine an age of code related to the defect. For example, the defects may be associated with new code, base code, rewritten code, refixed code, and the like. If a system is relatively new, it may be likely that a high percentage of defects are likely to be associated with new code.

If, however, a system includes a large amount of legacy code (base code), then testing and analysis may require verification that the base code was adequately tested, especially if customers have uncovered significant number of defects in a previous version of the software system. If a large number of defects are base code defects that were uncovered through simple triggers, it may indicate that the newest release design has a larger impact on an existing system than expected and that additional testing may be required to reduce the risk of moving to production.

The presence of rewritten code related defects may indicate the extent to which redesigning existing code injected defects, or failed to consider all functional cases. Refix defects, on the other hand, may be indicators of the extent to which areas of the system are prone to repeated defects due to poor documentation and/or design. In one embodiment of the invention, code age by trigger analysis may involve analyzing components and/or business processes to which the particular dominant age class of the defect relates.

In one embodiment of the invention, test effectiveness/coverage analysis may involve performing a code severity by number of days open analysis. The code severity by number of days analysis may determine whether the defects are being resolved according to a priority based on the severity of the defects. For example, ideally, defects with the oldest open dates may be the lowest severity defects, and vice versa.

If most of the defects that have been open for the longest period of time are high severity defects, it may indicate that the volume of defects is exceeding the software development teams capacity. Therefore, adequate mitigation strategies, such as, for example, hiring more developers, may be employed. If high severity defects fall outside a turnaround range for resolving the defects, it may indicate that there are system stability issues. High severity defects that take a proportionally long time to resolve may also indicate that the system requirements or design was not well defined, interlocked, and/or executed. Therefore, a artifact type over time and severity over time analysis may be performed to confirm such interpretation.

In one embodiment of the invention, test effectiveness/test coverage analysis may involve performing a severity by number of days open analysis. The severity by number of days open analysis may indicate whether the highest severity defects were quickly resolved, thereby indicating test effectiveness. For example, if the analysis indicates that low severity defects were handled relatively more quickly than high severity defects, it may indicate that the development team is not properly prioritizing and managing resolution of defects. Therefore, appropriate management and prioritization procedures may be implemented to improve effectiveness of defect resolution.

In one embodiment, a relatively high number of high severity defects being open for extended periods of time may indicate that capacity of the development team to handle defect resolution is exceeded. Therefore, appropriate personnel changes may be made to address the inadequate capacity. For example, more members may be added to the development team.

If it is determined that adequate personnel are available to handle defect resolution and that adequate prioritization and management procedures are in place, a high number of high severity defects being open for extended periods of time may indicate that there are system stability/completeness issues. Accordingly, the analysis described in subsection B (System Stability/Completeness analysis) of this section may be performed.

In one embodiment of the invention, high severity defects being open for an extended period of time may indicate deficiencies in system design or requirements. In one embodiment, an artifact type over time or a severity over time analysis as described in previous sections may be performed to determine whether the design and requirements deficiencies have been resolved. In one embodiment, severity by open date analysis may indicate adverse impact to the test and development schedule.

E. Exit Risk Analysis

In one embodiment of the invention, an exit risk analysis may be performed at the time of completion of a development cycle. The exit risk analysis may determine a risk of moving the product into production, marketing the product to a consumer and the like. For example, exit risk analysis may determine whether the risk of marketing a product to a consumer is high, medium, or low.

In one embodiment of the invention, exit risk analysis may based on product stability and/or process effectiveness. For example, measuring product stability may involve determining the overall trends of defects over time, trends of artifact type qualifiers over time, trends of artifact types over time, trends of artifact type qualifiers, trends of severity over time, reliability over time, and the like. Measuring process effectiveness may involve analyzing the trends of triggers over time.

III. RAPID ASSESSMENT ANALYSIS

In one embodiment of the invention, a rapid assessment option may be provided for analyzing defects. Rapid assessment of defects may involve determining a dominant class of defects and performing basic analysis steps for analyzing the defects. In one embodiment, rapid assessment of defects may involve performing a subset of analysis steps available for a particular category of defects. For example, a subset of the analysis steps for code defects outlined in section II may be performed for a rapid analysis of code defects. Rapid assessment may be performed, for example, to obtain a relatively quicker overview of the defects. In some embodiments, rapid assessment of the defects may be performed in relatively smaller software development projects.

A. Rapid Assessment of Data Defects

Data defects may be generally be associated with data dependencies and functionality of a system executing a software product. Analysis of data defects may provide an indication of the costs that may be incurred to cure the occurrence of defects, effect of defects on the project schedule, test effectiveness, and the like. Data defects may be caused by a variety of reasons including, but not limited to, data creation and/or data configuration processes and procedures, level of skill or training of customers and personnel developing the software product, interaction between the software product and customers and/or a component or system, communication across a system components or applications, and the like.

In one embodiment of the invention, rapid assessment of data defects may begin by performing a focus area analysis of the data defects. The focus area analysis of data defects may be performed based on one or more criteria. For example, the focus area analysis may be performed for each failing component, by open data of the defects, by business process, and the like.

A bar graph such as, for example, bar graph 900 of FIG. 9 may be generated to analyze the data defects. The length of each bar representing a particular component may indicate the total number of defects encountered for that component. Furthermore, each bar may also display the specific focus area affected by the defects for a component. Similar charts may be generated to identify dominant focus areas for business processes, open dates, and the like. By identifying the dominant focus areas for each component, for example, corrective actions may appropriately be taken to obviate errors associated with the component. For example, because focus area 3 is the dominant focus area for component 3 in FIG. 9, corrective actions may be taken to avoid defects affecting focus area 3 in component 3.

In one embodiment of the invention, a predetermined plan of action may exist to cure defects associated with a particular focus area. In one embodiment, the predetermined plan of action may be generated by a computer and displayed to a user, for example, a manager of the software development project.

Referring back to FIG. 3B, exemplary focus areas may include Skill/Training/Process, Communication, Component/System, and Customer. If the dominant focus area is Skills/Training/Process, defects are likely occurring due to inexperience, lack of skill, or knowledge on the part of a user or tester of the software product. Potential solutions for this focus area may include instituting training programs to improve the level of skill and knowledge of users. Addressing skills/training may require a static solution with an ongoing focus in order to be effective. For example, repeated training sessions may be required for new personnel as they join the organization developing the product.

In one embodiment, defects associated with skills/training/process may be used to identify process changes, which may obviate the need for repeated training. For example, a focus area bar graph may be generated by business process. By identifying dominant focus areas affected by defects for each business process, process changes may be instituted to obviate occurrence of the errors. For example, a process having many defects may be removed, replaced, or repaired to remove the defects. Based on the information derived from the focus area analysis, an organization may select any optimal balance between training and process adjustment to resolve defects.

If the dominant focus area is communication, defects may be occurring due to improper documentation or communication of database contents, data structures, data formats, and the like. If communication is found to be a dominant focus area during an interim progress/risk analysis, then it may indicate a detrimental effect on productivity and ineffectiveness of testing. One solution to avoid communication problems may be to investigate patterns and trends of the communication related defects on components and/or discuss the defects with customers or management to improve communication procedures. If communication is the dominant focus area, discussions may be held between owners of components and applications and/or customers to improve communication procedures.

If component/system is the dominant focus area, defects may be arising due to a defective component or application, a group of defective components or applications, or the system itself. In other words, the functionality of the product may not be the problem, but rather the problem may arise from a deficiency in one or more components, applications or the system.

There may be two general causes for data defects caused due to defective components, applications, the system, and the like. A first cause of the defects may be related to data with incorrect or missing elements being delivered by a component/system. Such data defects may result in increased cost to correct the defective components, schedule delays, and ineffective testing.

If component/system is the dominant focus area during interim progress/risk assessment, resolving defects may involve negotiating remedial actions with parties responsible for affected components/system causing the defects. If the component/system is the dominant focus area during phase exit risk analysis, this may indicate that remedial measures taken during the phase were ineffective. Similarly, future improvement analysis may indicate the effectiveness of remedial measures. Therefore, appropriate further remedial measures may be taken to reduce defects in future phases and products.

A second cause for component/system related defects may be improper overlaying or corruption of data due to flawed software logic or hardware failure, for example. If sufficient diagnostic capability is available to determine the cause of bad data, testing may be interrupted at least until the data is fixed. In one embodiment of the invention, fixing the bad data may be made a high priority task. If, however, the diagnostic capability is not available, the frequency of occurrence of the defects may be determined. If the frequency of errors is determined to be excessive, this may indicate a likely negative outlook for customer satisfaction. Therefore, development may be stopped until the defect is resolved.

If customer is the dominant focus area, date defects may be arising from bad data provided by the customer. Resolving defects arising from the customer may be resolved by notifying the customer and negotiating remedial actions at the earliest possible time to avoid increased costs, schedule delays, and the like.

In one embodiment of the invention, if any one focus area dominates in a relatively few number of components or applications across the system, rapid assessment of data defects may involve performing an artifact analysis on the components to determine corrective actions for resolving defects. For example, FIG. 12 illustrates a bar graph showing a single focus area dominating a few components. For example, as illustrated, components 1 and 2 have relatively a few number of defects. On the other hand, component 3 has a large number of defects, as indicated by the relative lengths of the bars. Furthermore, a large portion of the errors caused in component 3 are associated with focus area 3. Therefore, an artifact analysis may be performed for component 3 to identify corrective measures.

Referring back to FIG. 3A, exemplary artifact types may include, for example, master data configuration, validity, format, migration, corruption and the like. An artifact type qualifier may further describe each artifact type, as illustrated in FIG. 3A. In one embodiment of the invention, an artifact type by artifact type qualifier chart may be generated during artifact analysis.

FIG. 13 illustrates an exemplary artifact type by artifact type qualifier chart. As illustrated in FIG. 13, the length of the bar for each artifact type may indicate the number of defects associated with the artifact type. Furthermore, each bar may also indicate the number of defects associated with each artifact type qualifier associated with the artifact type. The artifact type qualifiers may be, for example, the artifact type qualifiers listed in FIG. 3A.

For example, the master data configuration bar 1310 indicates the number of errors associated with Artifact Type Qualifier (ATQ1), ATQ2, ATQ3, and ATQ4. In one embodiment, ATQ1 may represent defects caused due to incorrect data, ATQ2 may represent defects associated with missing data, ATQ3 may be associated with confusing/misleading information provided by the customer, and ATQ4 may be associated with confusing/misleading data provided by a component or system (See FIG. 3A).

In one embodiment of the invention, if a significant proportion of master data configuration related defects are attributable to incorrect data or missing data, then the defects may be caused due to weaknesses in skills/training or process. Accordingly, a predetermined plan associated with the skills/training/process focus area described in the previous section may be implemented.

In one embodiment of the invention, if a significant proportion of master data configuration related defects are attributable to confusing or misleading data provided by a customer, a predetermined plan associated with the customer focus area described in the previous section may be implemented. If a significant proportion of master data configuration related defects are attributable to confusing or misleading data provided by a system or component, a predetermined plan associated with the system/component focus area described in the previous section may be implemented In one embodiment of the invention, if a significant portion of validity related data defects are attributable to incorrect data, withdrawn data or expired data, the defects may be determined to be emanating from deficiencies in skill/training or process. Accordingly, a predetermined plan associated with the skills/training/process focus area described in the previous section may be implemented.

In one embodiment of the invention, if a significant portion of validity related data defects are attributable to incorrect data created by test, withdrawn but overlooked data or expired but overlooked data, the defects may be determined to be emanating from deficiencies in skill/training or process. Accordingly, a predetermined plan associated with the skills/training/process focus area described in the previous section may be implemented.

In one embodiment of the invention, if a significant portion of validity related data defects are attributable to withdrawn data, but not notified by customer and expired data but not notified by customer, the defects may be determined to be emanating from improper communication with the customer. Accordingly, a predetermined plan associated with the communication with customer focus area described in the previous section may be implemented.

In one embodiment of the invention, if a significant portion of validity related data defects are attributable to withdrawn data, but not notified by component/system and expired data but not notified by component/system, the defects may be determined to be emanating from improper communication between components/system. Accordingly, a predetermined plan associated with the communication with component/system focus area described in the previous section may be implemented.

In one embodiment of the invention, if a significant portion of validity related data defects are attributable to data that is incorrect when received from the customer or data that is confusing or misleading when received from the customer, the defects may be determined to be emanating from the customer. Accordingly, a predetermined plan associated with the customer focus area described in the previous section may be implemented.

In one embodiment of the invention, if a significant portion of validity related data defects are attributable to data that is incorrect when received from a component/system or data that is confusing or misleading when received from a component/system, the defects may be determined to be emanating from the component or system. Accordingly, a predetermined plan associated with the Component/System focus area described in the previous section may be implemented.

In one embodiment of the invention, if a significant portion of format related data defects are attributable to incorrect data created by test, the defects may be emanating from weaknesses in skill/training or process. Accordingly, a predetermined plan associated with the skills/training/process focus area described in the previous section may be implemented.

In one embodiment of the invention, if a significant portion of format related data defects are attributable to confusing or misleading information from a customer or incorrect data received from a customer, the defects may be emanating from the customer. Accordingly, a predetermined plan associated with the customer focus area described in the previous section may be implemented.

In one embodiment of the invention, if a significant portion of format related data defects are attributable to confusing or misleading information from a customer or incorrect data received from a component/system, the defects may be determined to be emanating from the component/system. Accordingly, a predetermined plan associated with the component/system focus area described in the previous section may be implemented.

In one embodiment of the invention, if a significant portion of migration related data defects are attributable to incorrectly mapped or missing (mapping) data, the defects may be determined to be emanating from weaknesses in skills/training or process. Accordingly, a predetermined plan associated with the skills/training/process focus area described in the previous section may be implemented.

In one embodiment of the invention, if a significant portion of corruption related data defects are attributable to source of corruption known and logic corrected for data provided by customer, source of corruption known and logic corrected for data provided by component/system, and source of corruption known and logic corrected for data created by test, then the defects may have been corrected and further occurrences of the defects may have been prevented. Therefore, the analysis may be provided to a customer, component/system, or test management for their records.

In one embodiment of the invention, if a significant portion of corruption related data defects are attributable to source of corruption unknown for data provided by customer, source of corruption unknown for data provided by component/system, and source of corruption unknown for data created by test, then the defects may be likely to occur again. Therefore, the analysis may be provided to a customer, component/system, or test management so that alternative remedies may be sought.

In one embodiment of the invention, if all the components or applications of the system display the same trends, an artifact type by focus area analysis may be performed to determine corrective actions.

In one embodiment of the invention, the trends of defects over time may be analyzed. For example, corrective measures taken to resolve defects may terminate the defect causing condition, therefore, resulting in no more defects of a particular type occurring. Accordingly, the trends over time assessment of defects may facilitate more accurate focusing of resources to actual problem areas rather than devoting resources to already resolved problems.

In one embodiment of the invention, a target by open date analysis may be performed to determine the trends of a particular target over a period of time. Targets may include, for example, data defects, environment defects, code defects, and the like.

Figure 14A:
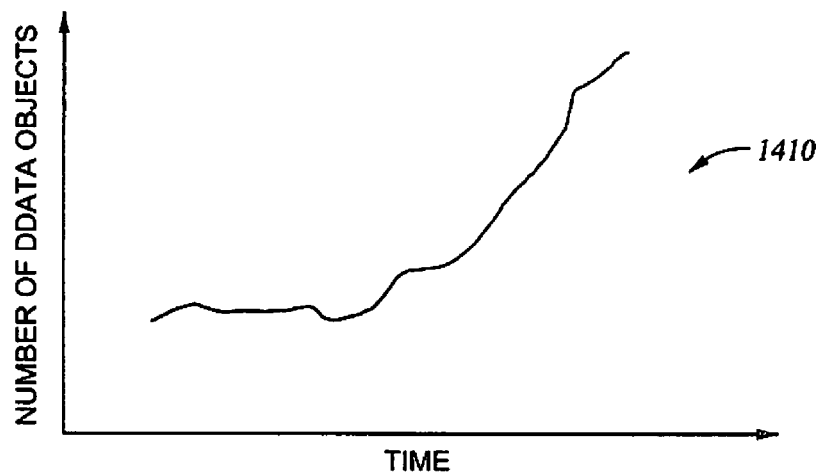
FIGS. 14A-C illustrate exemplary graphs generated during trends over time over time according to an embodiment of the invention.
Figure 14B:
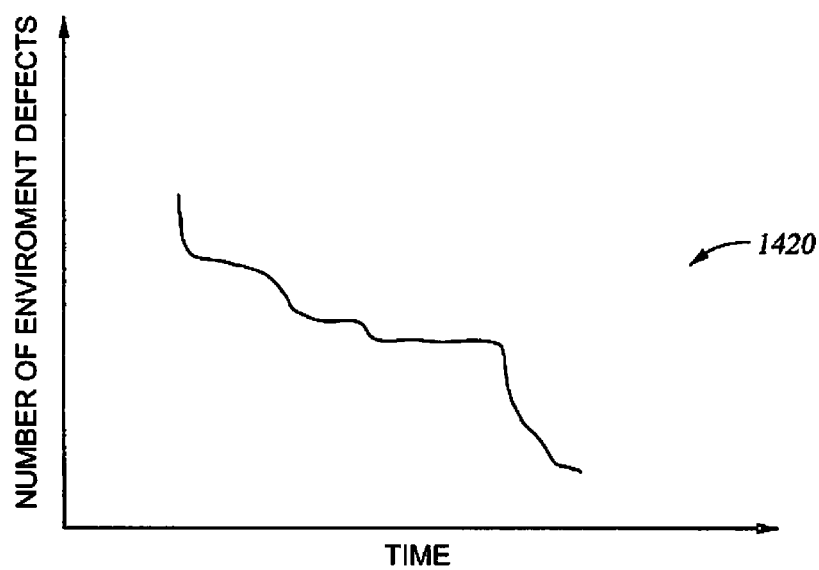
Figure 14C:
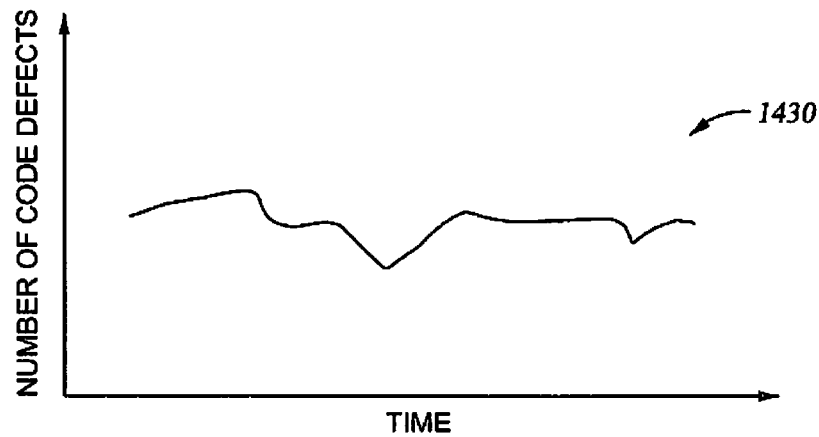

In one embodiment of the invention the target by open data analysis may be performed to determine a particular target area for devoting resources for defect resolution. FIGS. 14 A-C illustrate exemplary charts illustrating the trends over time for three target areas, namely, data defects, environment defects, and code defects. As illustrated in FIGS. 14 A-C, data defects chart 1410 shows an increasing number of data defects over time, environment defects chart 1420 shows a decreasing trend of defects over time, and code defects chart 1430 shows a relatively stable number of defects over time.

If the number of defects does not decrease over time, it may indicate a need for further analysis to identify problem areas. Accordingly an analysis path for a particular target area may be selected based on the trends over time analysis for a particular target area. For example, referring to FIGS. 14 A-C, a more detailed analysis may be necessary for data defects and code defects because the number of defects does not decrease over time for those target areas.

Furthermore, if a testing environment closely mirrors production environment, the occurrence of data defects may be likely to occur during production if not specifically addressed. Therefore, corrective actions may be necessary to resolve the data defects.

In one embodiment, if the data defects do not decrease over time, further analysis of the data defects may include determining trends of data defects over time for each component or application. The trends of data defects over time for each component may be performed to determine whether defects associated with each component or applications are pervasive over time. Pervasive or increasing defects for a particular component or application may indicate that the component or application is the source of the defect.

Once a particular component or application has been identified as error prone, assessments of artifact type and qualifier for the component may indicate the specific nature of the problem associated with the component or application. Corrective measures may therefore be taken according to the specific deficiencies in the component or application. One skilled in the art will recognize that the trends over time analysis of data defects for each component may be performed during interim progress and risk assessment or during phase exit risk assessment.

In one embodiment of the invention, a system stability analysis may be performed to determine, for example, a focus area and associated actions, a risk of moving forward to a next phase, improvements for a future product, and the like. For example, system stability analysis may include an artifact type by severity assessment. Severity may be a field associated with data structure 120 shown in FIG. 2, and may be entered for each defect by a person entering defect data when the defect is detected or resolved.

For high frequency artifact types, severity may be used to prioritize focus areas and associated actions. For example, the severity analysis may disclose data defects of greater significance, thereby allowing focusing of efforts to resolve the data defects of greater significance. Such focusing of efforts may allow, for example, cost of resolving defects to impact of resolving defects, thereby making resolution of defects more effective.

In one embodiment of the invention, data defect analysis may include performing a data preparedness assessment. Data preparedness assessment may involve performing, for example, an artifact type qualifier by component analysis. Data preparedness assessment may be performed to examine the distribution of artifact type qualifiers by failing component to identify problems associated with the access of data. For example, the 'query ease' issues associated with a particular data source may be examined.

If a predetermined artifact type qualifier dominates, either for a particular component or collectively for all components, then it may be likely that a data source could not be validated prior to the test. Artifact type qualifiers that show that a data source could not be validated include incorrect data created from test, incorrect data from component, incorrect data from customer, corruption source known and logic created (customer), corruption source known and logic corrected (component/system), corruption source known and logic corrected (created by test), corruption source unknown (customer), corruption source unknown (component/system), and corruption source unknown (created by test), for example.

B. Rapid Assessment of Environment Defects

Environment defects may generally be associated with a systems integration quality. In other words, environment defects may be related to the consumability or usability of the system based on the quality of system integration. Environment defects may arise from deficiencies in environment setup and configuration processes and procedures, skill/training, component or application maturity, communication, and the like.

In one embodiment of the invention, rapid assessment of environment defects may begin by performing a focus area analysis of the data defects. The focus area analysis of data defects may be performed based on one or more criteria. For example, the focus area analysis may be performed for each failing component, by open data of the defects, by business process, and the like.

A focus area chart, such as, for example, focus area bar graph 900 in FIG. 9 may be generated for the environment defects. Referring back to FIG. 5B, exemplary focus areas may include Skill/Training/Process, Communication, Component/System, and the like. If the dominant focus area is Skills/Training/Process, defects are likely occurring due to inexperience, lack of skill, or knowledge on the part of a user or tester of the software product. Potential solutions for this focus area may include instituting training programs to improve the level of skill and knowledge of users. Addressing skills/training may require a static solution with an ongoing focus in order to be effective. For example, repeated training sessions may be required for new personnel as they join the organization developing the product.

In one embodiment, defects associated with skills/training/process may be used to identify process changes, which may obviate the need for repeated training. For example, a focus area bar graph may be generated by business process. By identifying dominant focus areas affected by defects for each business process, process changes may be instituted to obviate occurrence of the errors. For example, a process having many defects may be removed, replaced, or repaired to remove the defects. Based on the information derived from the focus area analysis, an organization may select any optimal balance between training and process adjustment to resolve defects.

If the dominant focus area is communication, defects may be occurring due to improper documentation or communication of database contents, data structures, data formats, and the like. If communication is found to be a dominant focus area during an interim progress/risk analysis, then it may indicate a detrimental effect on productivity and ineffectiveness of testing. One solution to avoid communication problems may be to investigate patterns and trends of the communication related defects on components and/or discuss the defects with customers or management to improve communication procedures. If communication is the dominant focus area, discussions may be held between owners of components and applications and/or customers to improve communication procedures.

If component/system is the dominant focus area, defects may be arising due to a defective component or application, a group of defective components or applications, or the system itself. In other words, the functionality of the product may not be the problem, but rather the problem may arise from a deficiency in one or more components, applications or the system. In one embodiment, if the defects are not associated with a components functional capability, resolving the defects may be assigned a low priority as the defect may be corrected by the component/application owner during component testing. However, high priority defects may require adjustments to the schedule or other mitigation actions.

In one embodiment of the invention, if any one focus area dominates in a relatively few number of components or applications across the system, rapid assessment of environment defects may involve performing an artifact analysis on the components to determine corrective actions for resolving defects. Referring back to FIG. 5A, exemplary artifact types may include, for example, configuration/definition, connectivity, system/component completeness, security dependency, reboot/restart/recycle, capacity, clear/refresh, maintenance, etc. An artifact type qualifier may further describe each artifact type, as illustrated in FIG. 5A. In one embodiment of the invention, an artifact type by artifact type qualifier chart may be generated during artifact analysis.

In one embodiment of the invention, if a significant portion of the configuration/definition related defects are described as incorrect, missing, and/or inadequate default taken, the defects may be determined to be associated with weaknesses in process, skills or training. Accordingly, one or more actions related to the skills/training/process focus area described above may be implemented.

In one embodiment of the invention, if a significant portion of the configuration/definition related defects are described as requirements, change unknown, or not documented, the defects may be determined to be associated with weaknesses in communication. Accordingly, one or more actions related to the communication focus area described above may be implemented.

In one embodiment of the invention, if a significant portion of the configuration/definition related defects are described as confusing or misleading information, the defects may be determined to be associated with weaknesses in a component or system. Accordingly, one or more actions related to the component/system focus area described above may be implemented.

In one embodiment of the invention, if a significant portion of the connectivity related defects are described as incorrect, missing, and/or incompatible, the defects may be determined to be associated with weaknesses in process, skills or training. Accordingly, one or more actions related to the skills/training/process focus area described above may be implemented.

In one embodiment of the invention, if a significant portion of the connectivity related defects are described as requirement, change unknown, or not documented, the defects may be determined to be associated with weaknesses in communication. Accordingly, one or more actions related to the communication focus area described above may be implemented.

In one embodiment of the invention, if a significant portion of the connectivity related defects are described as confusing or misleading information, the defects may be determined to be associated with weaknesses in a component or system. Accordingly, one or more actions related to the component/system focus area described above may be implemented.

In one embodiment of the invention, if a significant portion of the system/component completeness related, the defects may be determined to be associated with weaknesses in the component, application, or systems ability to deliver functionality to be tested on an agreed schedule.

In one embodiment of the invention, if a significant portion of the security dependency related defects are described as incorrect, missing, reset/restore and/or permissions not requested, the defects may be determined to be associated with weaknesses in process, skills or training. Accordingly, one or more actions related to the skills/training/process focus area described above may be implemented.

In one embodiment of the invention, if a significant portion of the security dependency related defects are described as requirement, change unknown, or not documented, the defects may be determined to be associated with weaknesses in communication. Accordingly, one or more actions related to the communication focus area described above may be implemented.

In one embodiment of the invention, if a significant portion of the security dependency related defects are described as confusing or misleading information, the defects may be determined to be associated with weaknesses in a component or system. Accordingly, one or more actions related to the component/system focus area described above may be implemented.

In one embodiment of the invention, if a significant portion of the reboot/recycle/restart related defects are found, the defects may be associated with the component/system focus area. A significant number of defects of this artifact type may indicate serious maturity deficiencies in a component. In other words, if using the system results in frequent reboot/restart/recycle operations, the individual components/applications with the highest number of defects may not be adequately detecting error conditions, addressing them, or at least reporting them or carrying on without interruption. A high proportion of immature components may indicate serious impediments in the schedule and poor customer satisfaction.

In one embodiment, if a significant portion of the reboot/recycle/restart related defects are described as diagnostics inadequate, the defects may be associated with immature components in terms of diagnostic capability. The component may also be in its earliest stages of development. In any case, the defects may indicate poor customer satisfaction.

In one embodiment, if a significant portion of the reboot/recycle/restart related defects are described as recoverability inadequate, the defects may be associated with components that provide adequate diagnostics but insufficient recoverability to perform cleanup, repair and the like. The defects may indicate poor customer satisfaction if sufficient enhancements to the component addressing recoverability are not made.

In one embodiment of the invention, if a significant portion of the capacity related defects are described as incorrect and/or missing, the defects may be determined to be associated with weaknesses in process, skills, or training. Accordingly, one or more actions related to the skills/training/process focus area described above may be implemented.

In one embodiment of the invention, if a significant portion of the capacity related defects are described as confusing or misleading information, the defects may be determined to be associated with weaknesses in a component or system. Accordingly, one or more actions related to the component/system focus area described above may be implemented.

In one embodiment of the invention, if a significant portion of the capacity related defects are described as requirement, change unknown, or not documented, the defects may be determined to be associated with weaknesses in communication. Accordingly, one or more actions related to the communication focus area described above may be implemented.

In one embodiment of the invention, if a significant portion of the clear/refresh related defects are described as scheduled, the defects may indicate the need to execute a clear or refresh operation on some prescribed basis was well documented and understood. In one embodiment of the invention, if a significant portion of the clear/refresh related defects are described as unscheduled, the defects may indicate that clear and refresh operations were performed excessively. This may indicate weaknesses in components in terms of cleanup and recovery capabilities.

In one embodiment of the invention, if a significant portion of the maintenance related defects are described as scheduled, the defects may indicate the need to execute a maintenance operation on some prescribed basis was well documented and understood. In one embodiment of the invention, if a significant portion of the maintenance related defects are described as unscheduled, the defects may indicate that maintenance operations were performed excessively.

In one embodiment of the invention, rapid assessment of environment defects may involve performing an artifact type by severity analysis. The artifact type by severity analysis, for example, may be performed for high frequency artifact types. Based on the severity of defects related to a particular artifact type, focus areas and corrective actions may appropriately be determined.

C. Rapid Assessment of Code Defects

Rapid assessment of code defects may involve performing a subset of analysis operations described in section II (Analysis of Code Defects). For example, rapid assessment of code defects may involve performing focus area analysis of the code defects as described in section II, subsection A; and artifact type by open data analysis, artifact type qualifier by open date analysis, and severity by open data analysis as described in section II, subsection B.

IV. CONCLUSION

Figure 15:
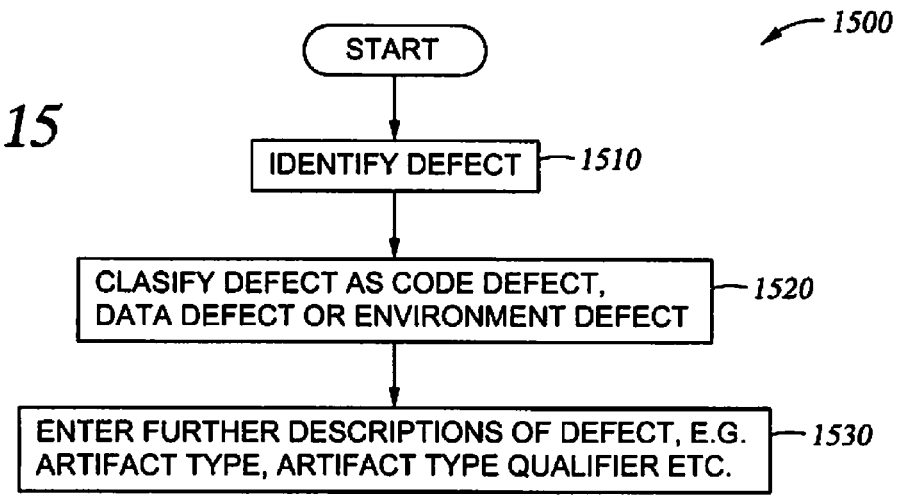
FIG. 15 is a flow diagram of exemplary operations performed during defect classification, according to an embodiment of the invention.

FIG. 15 illustrates a flow diagram of exemplary operations performed to classify defects. The operations may begin in step 1510 by identifying a defect while testing a software product. In step 1520, the defect may be classified as, for example, a code defect, data defect, or environment defect. Data regarding the defect may be stored in a data structure. In step 1530, one or more further descriptions of the defect and resolution of the defect may be entered in the data structure. For example, an artifact type, artifact type qualifier, impact area, and the like may be defined to further describe the defect.

Figure 16:
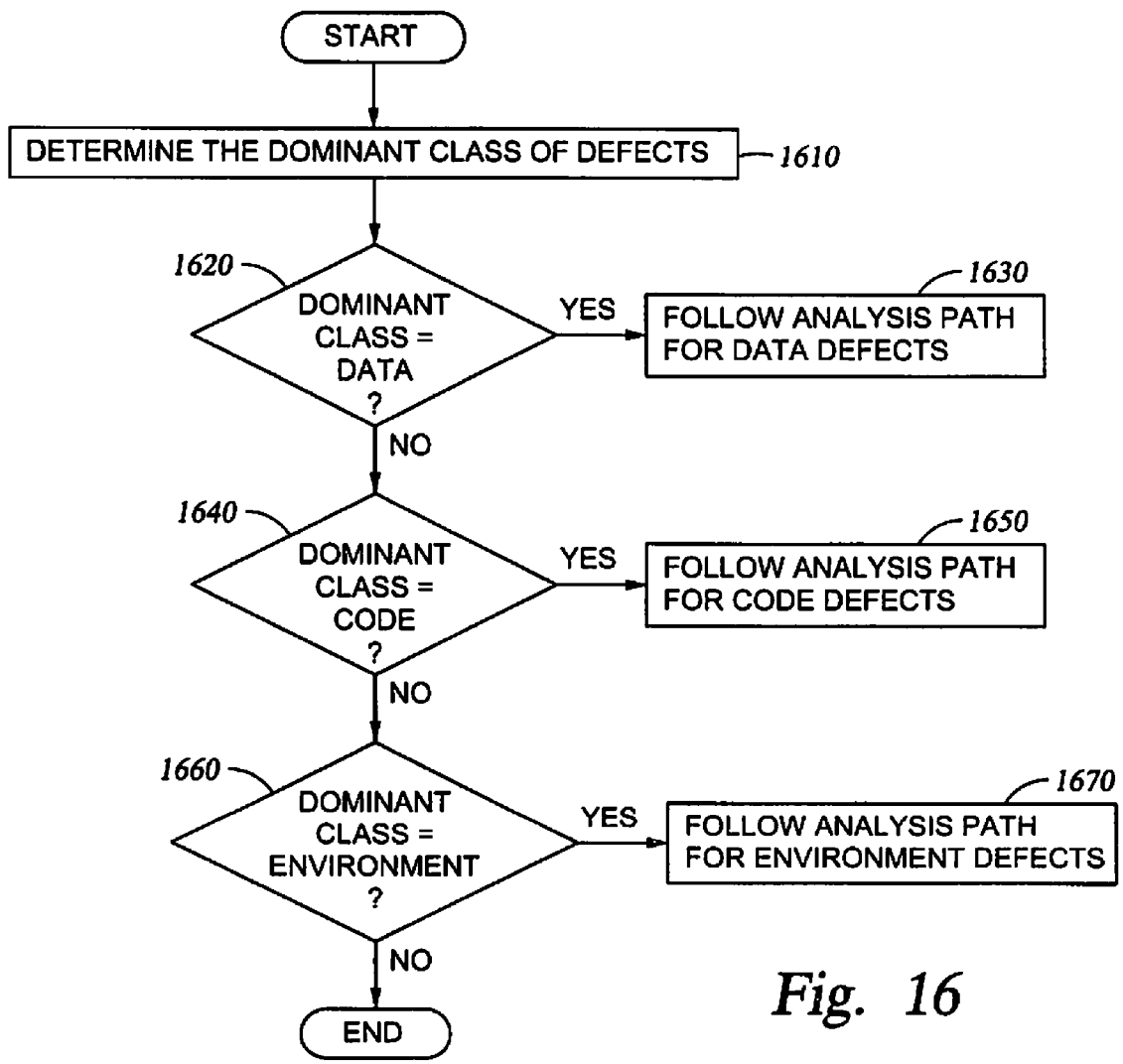
FIG. 16 is a flow diagram of exemplary operations performed during defect analysis, according to an embodiment of the invention.

FIG. 16 illustrates exemplary operations performed to analyze defects. The operations may begin in step 1610 by determining a dominant class of defects. In step 1620, if the dominant class of defects is determined to be data defects, then in step 1630 an analysis path for data defects may be followed to determine a cause for the data defects. For example, the analysis path for data defects may involve performing a rapid analysis of data defects as described above.

In step 1640, if the dominant class of defects is determined to be code defects, then in step 1650 an analysis path for code defects may be followed to determine a cause for the code defects. In step 1660, if the dominant class of defects is determined to be environment defects, then in step 1670 an analysis path for environment defects may be followed to determine a cause for the environment defects. Generally, analysis of defects may involve performing one or more of focus area analysis, artifact analysis, artifact type analysis, trends over time analysis, and the like as described above.

In one embodiment of the invention, data defect analysis described above may be configured to work in conjunction with orthogonal defect classification (ODC) analysis. In other words, the data defect classification and analysis may be integrated with ODC to enhance the ability of ODC to recognize data defects in addition to code defects, thereby allowing ODC to perform a more meaningful analysis of defects encountered during testing of a software product.

By allowing defects to be classified as data defects, code defects, or environment defects, and providing further classification options to describe the defects, embodiments of the invention facilitate better analysis of defects associated with a software development project to determine particular problem areas causing the defects. If a particular class of defects is determined to be the dominant class of defects encountered during testing, an analysis path of that class of defects may be followed to determine a cause for the class of defects. Therefore, corrective measures tailored to resolving the defects associated with the class may be taken.

While the foregoing is directed to embodiments of the present invention, other and further embodiments of the invention may be devised without departing from the basic scope thereof, and the scope thereof is determined by the claims that follow.

What is claimed is:

1. A method for analyzing defects associated with a software system, comprising:
    identifying one or more defects during testing of the software system;
    classifying each defect of the one or more defects into one of a plurality of classes of defects, wherein the plurality of classes of defects comprise data defects, environment defects, and code defects;
    storing descriptions of each defect of the one or more defects in a data structure, wherein the descriptions comprise the classification of the defect; and
    for each defect, analyzing the description of the defect stored in the data structure to determine a cause for the defect within one of the classes of defects, the analyzing comprising:

determining a dominant class of defects, wherein the dominant class of defects comprises a majority of the defects; and analyzing the dominant class of defects to determine a cause for one or more of the defects within the dominant class of defects.

2. The method of claim 1, wherein classifying the defects comprises classifying at least one defect in each of the data defects, environment defects, and code defects.

3. The method of claim 2, wherein storing descriptions of the defects comprises defining for each defect at least one defect metric, wherein defect metrics comprise any combination of target, artifact type, artifact type qualifier, impact, and open date of the defect.

4. The method of claim 3, wherein storing descriptions of the defects and resolution of the defects further comprises determining a focus area for each defect, wherein the focus area is determined based on one or more defect metrics.

5. The method of claim 1, further comprising:
if a class of defects does not dominate the defects, performing a trends over time analysis for each class of defects; and
analyzing the class of defects having pervasive or increasing defects over time to determine a cause for one or more of the defects within the class of defects having pervasive or increasing defects over time.

6. A method for analyzing defects associated with a software system, comprising:
identifying one or more defects during testing of the software system;
classifying each defect into one of a plurality of classes of defects, wherein the classes of defects comprise data defects, environment defects, and code defects and classifying the defects comprises classifying at least one defect in each of the data defects, environment defects, and code defects;
storing descriptions of each defect in a data structure, wherein the descriptions comprise the classification of the defects; and
analyzing a class of defects stored in the data structure to determine a cause for one or more of the defects within the class of defects,
wherein analyzing code defects comprises performing focus area analysis, system stability and completeness analysis, customer satisfaction analysis, test effectiveness and coverage analysis, and exit risk analysis.

7. The method of claim 6, wherein analyzing the class of defects comprises performing a rapid assessment of the class of defects, wherein performing a rapid assessment of the class of defects comprises performing at least a focus area analysis of the class of defects.

8. A non-transitory computer readable storage medium comprising a defect analysis tool which, when executed, performs operations for analyzing defects associated with a software system, comprising:
identifying one or more defects during testing of the software system;
classifying each defect of the one or more defects into one of a plurality of classes of defects, wherein the classes of defects comprise data defects, environment defects, and code defects;
storing descriptions of each defect of the one or more defects in a data structure, wherein the descriptions comprise the classification of the defects; and for each defect, analyzing the description of the defect stored in the data structure to determine a cause for the defect within one of the classes of defects, the analyzing comprising:
determining a dominant class of defects, wherein the dominant class of defects comprises a majority of the defects; and
analyzing the dominant class of defects to determine a cause for one or more of the defects within the dominant class of defects.

9. The computer readable storage medium of claim 8, wherein storing descriptions of the defects comprises defining for each defect at least one defect metric, wherein defect metrics comprise any combination of target, artifact type, artifact type qualifier, impact, and open date of the defect.

10. The computer readable storage medium of claim 9, wherein storing descriptions of the defects and resolution of the defects further comprises determining a focus area for each defect, wherein the focus area is determined based on one or more defect metrics.

11. The computer readable storage medium of claim 8, the operation further comprising:
determining a dominant class of defects, wherein the dominant class of defects comprises a majority of the defects; and
analyzing the dominant class of defects to determine a cause for one or more of the defects within the dominant class of defects.

12. A computer readable storage medium comprising a defect analysis tool which, when executed, performs operations for analyzing defects associated with a software system, comprising:
identifying one or more defects during testing of the software system;
classifying each defect into one of a plurality of classes of defects, wherein the classes of defects comprise data defects, environment defects, and code defects;
storing descriptions of each defect in a data structure, wherein the descriptions comprise the classification of the defects; and
analyzing a class of defects stored in the data structure to determine a cause for one or more of the defects within the class of defects,
wherein analyzing code defects comprises performing focus area analysis, system stability and completeness analysis, customer satisfaction analysis, test effectiveness and coverage analysis, and exit risk analysis.

13. A system, comprising:
a memory device comprising:
a defect data collection tool,
a defect analysis tool, and
a data structure coupled with the defect data collection tool and the defect analysis tool, wherein the data structure is configured to receive descriptions of one or more defects identified during testing of a software system from the defect data collection tool, the descriptions comprising a classification of each defect of the one or more defects into one of a plurality of classes of defects, wherein the classes of defects comprise data defects, environment defects, and code defects, and wherein the defect analysis tool is configured to access the data structure and, for each defect, analyze the description of the defect stored in the data structure to determine a cause for the defect within one of the classes of defects; wherein the analyzing comprising:

determining a dominant class of defects, wherein the dominant class of defects comprises a majority of the defects; and analyzing the dominant class of defects to determine a cause for one or more of the defects within the dominant class of defects.

14. The system of claim 13, wherein the defect data collection tool is configured to define for each defect at least one defect metric, wherein defect metrics comprise any combination of target, artifact type, artifact type qualifier, impact, and open date of the defect.

15. The system of claim 14, wherein the defect data collection tool is configured to determine a focus area for each defect, wherein the focus area is determined based on one or more defect metrics.

16. The system of claim 13, wherein the defect analysis tool is further configured to:

perform a trends over time analysis for each class of defects; and analyze the class of defects having pervasive or increasing defects over time to determine a cause for one or more of the defects within the class of defects having pervasive or increasing defects over time.

17. The system of claim 13, wherein the defect analysis tool is configured to analyze the class of defects by performing a rapid assessment of the class of defects, wherein performing a rapid assessment of the class of defects comprises performing at least the focus area analysis of the class of defects.

18. A system, comprising:

a defect data collection tool;

a defect analysis tool, wherein the defect analysis tool is configured to analyze code defects by performing focus area analysis, system stability and completeness analysis, customer satisfaction analysis, test effectiveness and coverage analysis, and exit risk analysis; and a data structure coupled with the defect data collection tool and the defect analysis tool, wherein the data structure is configured to receive descriptions of defects identified during testing of a software system from the defect data collection tool, the descriptions comprising a classification of each defect into one of a plurality of classes of defects, wherein the classes of defects comprise data defects, environment defects, and code defects, and wherein the defect analysis tool is configured to access the data structure and analyze a class of defects stored in the data structure to determine a cause for one or more of the defects within the class of defects; wherein the analyzing comprising:

determining a dominant class of defects, wherein the dominant class of defects comprises a majority of the defects; and analyzing the dominant class of defects to determine a cause for one or more of the defects within the dominant class of defects.

19. A method for analyzing defects associated with a software project, comprising:

installing a defect data collection tool for testing the software project, the defect data collection tool being configured for:

describing one or more defects identified during testing, the description of each defect of the one or more defects comprising a classification of the defect into one of a plurality of predetermined classes of defects, wherein the classes of defects comprise data defects, environment defects, and code defects; and storing the description of each defect of the one or more defects in a data structure; and installing a defect analysis tool, the defect analysis tool being configured for analyzing the description of each defect stored in the data structure for determining a cause for the defect within one of the classes of defects; wherein the analyzing comprising:

determining a dominant class of defects, wherein the dominant class of defects comprises a majority of the defects; and analyzing the dominant class of defects to determine a cause for one or more of the defects within the dominant class of defects.

* * * * *